US007594055B2

(12) United States Patent  
Gower et al.

(10) Patent No.: US 7,594,055 B2  
(45) Date of Patent: Sep. 22, 2009

(54) SYSTEMS AND METHODS FOR PROVIDING DISTRIBUTED TECHNOLOGY INDEPENDENT MEMORY CONTROLLERS

(75) Inventors: Kevin C. Gower, LaGrangeville, NY (US); Warren E. Maule, Cedar Park, TX (US); Robert B. Tremaine, Stormville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/420,034

(22) Filed: May 24, 2006

(65) Prior Publication Data

US 2007/0276976 A1 Nov. 29, 2007

(51) Int. Cl.  
*G06F 13/14* (2006.01)
(52) U.S. Cl. .................. 710/305; 710/306; 710/311
(58) Field of Classification Search ......... 710/305–306, 710/240–244, 311; 711/100, 106  
See application file for complete search history.

(56) References Cited

U.S. PATENT DOCUMENTS

| | | | |
|---|---|---|---|
| 2,842,682 A | 7/1958 | Clapper | |
| 3,333,253 A | 7/1967 | Sahulka | |
| 3,395,400 A | 7/1968 | De Witt | |
| 3,825,904 A | 7/1974 | Burk et al. | 340/172.5 |
| 4,028,675 A | 6/1977 | Frankenberg | 711/106 |
| 4,135,240 A | 1/1979 | Ritchie | |
| 4,150,428 A | 4/1979 | Inrig et al. | |
| 4,472,780 A | 9/1984 | Chenoweth et al. | |
| 4,475,194 A | 10/1984 | LaVallee et al. | 371/10 |
| 4,486,739 A | 12/1984 | Franaszek et al. | 340/347 |

(Continued)

FOREIGN PATENT DOCUMENTS

EP 0229316 A2 7/1987

(Continued)

OTHER PUBLICATIONS

IEEE, "IEEE Standard Test Access Port and Boundary-Scan Architecture", Jul. 23, 2001, IEEE Std 1149-1-2001, pp. 11-13.

(Continued)

*Primary Examiner*—Clifford H Knoll  
*Assistant Examiner*—Kim T Huynh  
(74) *Attorney, Agent, or Firm*—Cantor Colburn LLP

(57) ABSTRACT

Systems and methods for providing distributed technology independent memory controllers. Systems include a computer memory system for storing and retrieving data. The system includes a memory bus, a main memory controller, one or more memory devices characterized by memory device protocols and signaling requirements, and one or more memory hub devices. The main memory controller is in communication with the memory bus for generating, receiving, and responding to memory access requests. The hub devices are in communication with the memory bus and with the memory devices for controlling the memory devices responsively to the memory access requests received from the main memory controller and for responding to the main memory controller with state or memory data. The main memory controller and the hub devices communicate via the memory bus in messages in a message format and protocol for indicating memory read, memory write, memory system power management and control that is independent of the memory device protocols and signaling requirements.

31 Claims, 8 Drawing Sheets

U.S. PATENT DOCUMENTS

| | | | |
|---|---|---|---|
| 4,641,263 A | 2/1987 | Perlman et al. | |
| 4,654,857 A | 3/1987 | Samson et al. | |
| 4,723,120 A | 2/1988 | Petty, Jr. | 340/825.02 |
| 4,740,916 A | 4/1988 | Martin | 364/900 |
| 4,796,231 A | 1/1989 | Pinkham | 365/189.05 |
| 4,803,485 A | 2/1989 | Rypinski | 370/452 |
| 4,833,605 A | 5/1989 | Terada et al. | 364/200 |
| 4,839,534 A | 6/1989 | Clasen | 307/269 |
| 4,943,984 A | 7/1990 | Pechanek et al. | 375/109 |
| 4,985,828 A | 1/1991 | Shimizu et al. | 364/200 |
| 5,053,947 A | 10/1991 | Heibel et al. | 364/200 |
| 5,177,375 A | 1/1993 | Ogawa et al. | |
| 5,206,946 A | 4/1993 | Brunk | 710/2 |
| 5,214,747 A | 5/1993 | Cok | 395/27 |
| 5,265,049 A | 11/1993 | Takasugi | |
| 5,265,212 A | 11/1993 | Bruce, II | 710/113 |
| 5,287,531 A | 2/1994 | Rogers, Jr. et al. | 395/800 |
| 5,347,270 A | 9/1994 | Matsuda et al. | 340/2.21 |
| 5,357,621 A | 10/1994 | Cox | |
| 5,375,127 A | 12/1994 | Leak | |
| 5,387,911 A | 2/1995 | Gleichert et al. | 341/95 |
| 5,394,535 A | 2/1995 | Ohuchi | 711/155 |
| 5,454,091 A | 9/1995 | Sites et al. | 395/413 |
| 5,475,690 A | 12/1995 | Burns et al. | 370/105.3 |
| 5,513,135 A | 4/1996 | Dell et al. | 365/52 |
| 5,517,626 A | 5/1996 | Archer et al. | |
| 5,522,064 A | 5/1996 | Aldereguia et al. | |
| 5,544,309 A | 8/1996 | Chang et al. | |
| 5,546,023 A | 8/1996 | Borkar et al. | |
| 5,561,826 A | 10/1996 | Davies et al. | |
| 5,592,632 A | 1/1997 | Leung et al. | 395/306 |
| 5,594,925 A | 1/1997 | Harder et al. | |
| 5,611,055 A | 3/1997 | Krishan et al. | 395/281 |
| 5,613,077 A | 3/1997 | Leung et al. | 395/306 |
| 5,627,963 A | 5/1997 | Gabillard et al. | 714/42 |
| 5,629,685 A | 5/1997 | Allen et al. | 340/825.02 |
| 5,661,677 A | 8/1997 | Rondeau, II et al. | 365/63 |
| 5,666,480 A | 9/1997 | Leung et al. | 395/180 |
| 5,684,418 A | 11/1997 | Yanagiuchi | |
| 5,706,346 A | 1/1998 | Katta et al. | |
| 5,754,804 A | 5/1998 | Cheselka et al. | |
| 5,764,155 A | 6/1998 | Kertesz et al. | 340/825.08 |
| 5,822,749 A | 10/1998 | Agarwal | 707/2 |
| 5,852,617 A | 12/1998 | Mote, Jr. | 714/726 |
| 5,870,325 A | 2/1999 | Nielsen et al. | 365/63 |
| 5,872,996 A | 2/1999 | Barth et al. | 395/853 |
| 5,917,760 A | 6/1999 | Millar | |
| 5,926,838 A | 7/1999 | Jeddeloh | 711/167 |
| 5,928,343 A | 7/1999 | Farmwald et al. | 710/104 |
| 5,930,273 A | 7/1999 | Mukojima | 714/776 |
| 5,959,914 A | 9/1999 | Gates et al. | |
| 5,973,951 A | 10/1999 | Bechtolsheim et al. | 365/52 |
| 5,974,493 A | 10/1999 | Okumura et al. | 710/307 |
| 5,995,405 A | 11/1999 | Trick | 365/63 |
| 6,003,121 A | 12/1999 | Wirt | |
| 6,011,732 A | 1/2000 | Harrison et al. | |
| 6,038,132 A | 3/2000 | Tokunaga et al. | 361/760 |
| 6,049,476 A | 4/2000 | Laudon et al. | 365/52 |
| 6,076,158 A | 6/2000 | Sites et al. | 712/230 |
| 6,078,515 A | 6/2000 | Nielsen et al. | 365/63 |
| 6,081,868 A | 6/2000 | Brooks | |
| 6,085,276 A | 7/2000 | VanDoren et al. | |
| 6,096,091 A | 8/2000 | Hartmann | 716/17 |
| 6,128,746 A | 10/2000 | Clark et al. | 713/324 |
| 6,145,028 A | 11/2000 | Shank et al. | |
| 6,170,047 B1 | 1/2001 | Dye | 711/170 |
| 6,170,059 B1 | 1/2001 | Pruett et al. | 713/200 |
| 6,173,382 B1 | 1/2001 | Dell et al. | 711/170 |
| 6,185,718 B1 | 2/2001 | Dell et al. | |
| 6,198,304 B1 | 3/2001 | Sasaki | |
| 6,215,686 B1 | 4/2001 | Deneroff et al. | 365/52 |
| 6,219,288 B1 | 4/2001 | Braceras et al. | |
| 6,219,760 B1 | 4/2001 | McMinn | |
| 6,233,639 B1 | 5/2001 | Dell et al. | |
| 6,260,127 B1 | 7/2001 | Olarig et al. | 711/167 |
| 6,262,493 B1 | 7/2001 | Garnett | |
| 6,285,172 B1 | 9/2001 | Torbey | |
| 6,292,903 B1 | 9/2001 | Coteus et al. | 713/401 |
| 6,301,636 B1 | 10/2001 | Schultz et al. | 711/108 |
| 6,308,247 B1 | 10/2001 | Ackerman et al. | |
| 6,317,352 B1 | 11/2001 | Halbert et al. | 365/52 |
| 6,321,343 B1 | 11/2001 | Toda | 713/600 |
| 6,338,113 B1 | 1/2002 | Kubo et al. | 711/105 |
| 6,349,390 B1 | 2/2002 | Dell et al. | |
| 6,357,018 B1 | 3/2002 | Stuewe et al. | |
| 6,370,631 B1 | 4/2002 | Dye | 711/170 |
| 6,378,018 B1 | 4/2002 | Tsern et al. | 710/129 |
| 6,381,685 B2 | 4/2002 | Dell et al. | |
| 6,393,512 B1 | 5/2002 | Chen et al. | |
| 6,393,528 B1 | 5/2002 | Arimilli et al. | 711/137 |
| 6,408,398 B1 | 6/2002 | Frecker et al. | |
| 6,425,044 B1 | 7/2002 | Jeddeloh | |
| 6,446,174 B1 | 9/2002 | Dow | |
| 6,467,013 B1 | 10/2002 | Nizar | |
| 6,473,836 B1 | 10/2002 | Ikeda | 711/137 |
| 6,477,614 B1 | 11/2002 | Leddige et al. | |
| 6,483,755 B2 | 11/2002 | Leung et al. | 365/189.05 |
| 6,484,271 B1 | 11/2002 | Gray | |
| 6,487,102 B1 | 11/2002 | Halbert et al. | |
| 6,487,627 B1 | 11/2002 | Willke et al. | 710/306 |
| 6,493,250 B2 | 12/2002 | Halbert et al. | 365/63 |
| 6,496,540 B1 | 12/2002 | Widmer | 375/242 |
| 6,496,910 B1 | 12/2002 | Baentsch et al. | 711/165 |
| 6,499,070 B1 | 12/2002 | Whetsel | |
| 6,502,161 B1 | 12/2002 | Perego et al. | 711/5 |
| 6,507,888 B2 | 1/2003 | Wu et al. | 711/105 |
| 6,510,100 B2 | 1/2003 | Grundon et al. | 365/233 |
| 6,513,091 B1 | 1/2003 | Blackmon et al. | 710/316 |
| 6,530,007 B2 | 3/2003 | Olarig | |
| 6,532,525 B1 | 3/2003 | Aleksic et al. | 711/168 |
| 6,546,359 B1 | 4/2003 | Week | 702/186 |
| 6,549,971 B1 | 4/2003 | Cecchi et al. | 710/306 |
| 6,553,450 B1 | 4/2003 | Dodd et al. | 711/105 |
| 6,557,069 B1 | 4/2003 | Drehmel et al. | 710/307 |
| 6,564,329 B1 | 5/2003 | Cheung et al. | 713/322 |
| 6,584,576 B1 | 6/2003 | Co | |
| 6,587,912 B2 | 7/2003 | Leddige | |
| 6,590,827 B2 | 7/2003 | Chang et al. | |
| 6,594,713 B1 | 7/2003 | Fuocco et al. | |
| 6,594,748 B1 | 7/2003 | Lin | |
| 6,601,121 B2 | 7/2003 | Singh et al. | 710/112 |
| 6,601,149 B1 | 7/2003 | Brock et al. | |
| 6,604,180 B2 | 8/2003 | Jeddeloh | |
| 6,611,905 B1 | 8/2003 | Grundon et al. | 711/167 |
| 6,622,217 B2 | 9/2003 | Gharacorloo et al. | 711/141 |
| 6,622,227 B2 | 9/2003 | Zumkehr et al. | |
| 6,625,687 B1 | 9/2003 | Halbert et al. | 711/105 |
| 6,625,702 B2 | 9/2003 | Rentschler et al. | |
| 6,628,538 B2 | 9/2003 | Funaba et al. | 365/63 |
| 6,631,439 B2 | 10/2003 | Saulsbury et al. | 711/104 |
| 6,636,957 B2 | 10/2003 | Stevens et al. | |
| 6,643,745 B1 | 11/2003 | Palanca et al. | |
| 6,671,376 B1 | 12/2003 | Koto et al. | 380/210 |
| 6,678,811 B2 | 1/2004 | Rentschler et al. | 711/167 |
| 6,681,292 B2 | 1/2004 | Creta et al. | |
| 6,684,320 B2 | 1/2004 | Mohamed et al. | |
| 6,697,919 B2 | 2/2004 | Gharachorloo et al. | 711/141 |
| 6,704,842 B1 | 3/2004 | Janakiraman et al. | 711/141 |
| 6,721,185 B2 | 4/2004 | Dong et al. | |
| 6,721,944 B2 | 4/2004 | Chaudhry et al. | 717/154 |
| 6,738,836 B1 | 5/2004 | Kessler et al. | 710/22 |
| 6,741,096 B2 | 5/2004 | Moss | |
| 6,748,518 B1 | 6/2004 | Guthrie et al. | |
| 6,754,762 B1 | 6/2004 | Curley | |

| | | | | | |
|---|---|---|---|---|---|
| 6,766,389 B2 | 7/2004 | Hayter et al. ............... 710/62 | 2003/0056183 A1 | 3/2003 | Kobayashi |
| 6,775,747 B2 | 8/2004 | Venkatraman ............ 711/137 | 2003/0084309 A1 | 5/2003 | Kohn ..................... 713/189 |
| 6,791,555 B1 | 9/2004 | Radke et al. ............... 345/532 | 2003/0090879 A1 | 5/2003 | Doblar et al. ............. 361/728 |
| 6,792,495 B1* | 9/2004 | Garney et al. ............. 710/305 | 2003/0105938 A1 | 6/2003 | Cooksey et al. |
| 6,799,241 B2 | 9/2004 | Kahn et al. | 2003/0118044 A1 | 6/2003 | Blanc et al. |
| 6,839,393 B1 | 1/2005 | Sidiropoulos ............... 375/371 | 2003/0126354 A1 | 7/2003 | Kahn et al. |
| 6,877,076 B1 | 4/2005 | Cho et al. ................. 711/157 | 2003/0126363 A1 | 7/2003 | David |
| 6,877,078 B2 | 4/2005 | Fujiwara et al. ............ 711/167 | 2003/0223303 A1 | 12/2003 | Lamb et al. ............ 365/230.06 |
| 6,882,082 B2 | 4/2005 | Greeff et al. | 2003/0229770 A1 | 12/2003 | Jeddeloh |
| 6,889,284 B1 | 5/2005 | Nizar et al. ................. 710/315 | 2003/0235222 A1 | 12/2003 | Bridges et al. |
| 6,898,726 B1 | 5/2005 | Lee | 2003/0236959 A1 | 12/2003 | Johnson et al. ............ 711/167 |
| 6,910,146 B2 | 6/2005 | Dow | 2004/0006674 A1 | 1/2004 | Hargis et al. .............. 711/156 |
| 6,918,068 B2 | 7/2005 | Vail et al. | 2004/0015650 A1 | 1/2004 | Zumkehr et al. |
| 6,938,119 B2 | 8/2005 | Kohn et al. | 2004/0049723 A1 | 3/2004 | Obara ..................... 714/729 |
| 6,944,084 B2 | 9/2005 | Wilcox | 2004/0078615 A1 | 4/2004 | Martin et al. |
| 6,948,091 B2 | 9/2005 | Bartels et al. | 2004/0098546 A1 | 5/2004 | Bashant et al. |
| 6,949,950 B2 | 9/2005 | Takahashi et al. ............ 326/37 | 2004/0098549 A1 | 5/2004 | Dorst |
| 6,965,952 B2 | 11/2005 | Echartea et al. | 2004/0117588 A1 | 6/2004 | Arimilli et al. ............. 711/203 |
| 6,977,536 B2 | 12/2005 | Chin-Chieh et al. ......... 327/116 | 2004/0123222 A1 | 6/2004 | Widmer |
| 6,993,612 B2 | 1/2006 | Porterfield | 2004/0128474 A1 | 7/2004 | Vorbach ..................... 712/10 |
| 6,996,639 B2 | 2/2006 | Narad | 2004/0148482 A1 | 7/2004 | Grundy et al. |
| 7,039,755 B1* | 5/2006 | Helms .................... 711/106 | 2004/0160832 A1 | 8/2004 | Janzen et al. |
| 7,047,370 B1 | 5/2006 | Jeter, Jr. et al. | 2004/0163028 A1 | 8/2004 | Olarig |
| 7,047,371 B2 | 5/2006 | Dortu | 2004/0165609 A1 | 8/2004 | Herbst et al. |
| 7,047,384 B2 | 5/2006 | Bodas et al. | 2004/0199363 A1 | 10/2004 | Bohizic et al. |
| 7,076,700 B2 | 7/2006 | Rieger | 2004/0205433 A1 | 10/2004 | Gower et al. |
| 7,103,792 B2 | 9/2006 | Moon | 2004/0230718 A1 | 11/2004 | Polzin et al. ................. 710/22 |
| 7,120,743 B2 | 10/2006 | Meyer et al. | 2004/0246767 A1 | 12/2004 | Vogt ..................... 365/154 |
| 7,133,790 B2 | 11/2006 | Liou | 2004/0250153 A1 | 12/2004 | Vogt ..................... 713/500 |
| 7,133,972 B2 | 11/2006 | Jeddeloh | 2004/0260909 A1 | 12/2004 | Lee et al. .................. 711/213 |
| 7,177,211 B2 | 2/2007 | Zimmerman | 2004/0260957 A1 | 12/2004 | Jeddeloh et al. ........... 713/300 |
| 7,194,593 B2 | 3/2007 | Schnepper | 2005/0023560 A1 | 2/2005 | Ahn et al. .................. 257/200 |
| 7,197,594 B2 | 3/2007 | Raz et al. | 2005/0027941 A1 | 2/2005 | Wang et al. |
| 7,203,318 B2 | 4/2007 | Collum et al. | 2005/0033906 A1* | 2/2005 | Mastronarde et al. ....... 711/100 |
| 7,206,887 B2* | 4/2007 | Jeddeloh .................... 710/311 | 2005/0044305 A1 | 2/2005 | Jakobs et al. |
| 7,206,962 B2 | 4/2007 | Deegan | 2005/0050237 A1 | 3/2005 | Jeddeloh et al. .............. 710/10 |
| 7,210,059 B2 | 4/2007 | Jeddeloh | 2005/0050255 A1 | 3/2005 | Jeddeloh .................... 710/317 |
| 7,216,196 B2 | 5/2007 | Jeddeloh | 2005/0066136 A1 | 3/2005 | Schnepper ................ 711/154 |
| 7,216,276 B1 | 5/2007 | Azimi et al. | 2005/0071542 A1 | 3/2005 | Weber et al. |
| 7,222,213 B2 | 5/2007 | James | 2005/0071707 A1 | 3/2005 | Hampel |
| 7,227,949 B2 | 6/2007 | Heegard et al. | 2005/0078506 A1 | 4/2005 | Rao et al. |
| 7,240,145 B2 | 7/2007 | Holman | 2005/0080581 A1 | 4/2005 | Zimmerman et al. ........ 702/117 |
| 7,260,685 B2 | 8/2007 | Lee et al. | 2005/0081129 A1 | 4/2005 | Shah et al. |
| 7,266,634 B2 | 9/2007 | Ware et al. | 2005/0086424 A1 | 4/2005 | Oh et al. |
| 7,296,129 B2 | 11/2007 | Gower et al. | 2005/0086441 A1 | 4/2005 | Myer et al. |
| 7,313,583 B2 | 12/2007 | Porten et al. | 2005/0097249 A1 | 5/2005 | Oberlin et al. |
| 7,321,979 B2 | 1/2008 | Lee | 2005/0105350 A1 | 5/2005 | Zimmerman et al. |
| 7,353,316 B2 | 4/2008 | Erdmann | 2005/0120157 A1 | 6/2005 | Chen et al. .................. 710/313 |
| 7,363,419 B2 | 4/2008 | Cronin et al. | 2005/0125702 A1 | 6/2005 | Huang et al. ............... 713/320 |
| 7,363,436 B1 | 4/2008 | Yeh et al. | 2005/0125703 A1 | 6/2005 | Lefurgy et al. .............. 713/320 |
| 7,370,134 B2 | 5/2008 | Jeddeloh | 2005/0138246 A1 | 6/2005 | Chen et al. |
| 7,386,575 B2 | 6/2008 | Bashant et al. | 2005/0138267 A1 | 6/2005 | Bains et al. |
| 7,418,526 B2 | 8/2008 | Jeddeloh | 2005/0144399 A1 | 6/2005 | Hosomi ..................... 711/145 |
| 7,421,525 B2 | 9/2008 | Polzin et al. | 2005/0149665 A1 | 7/2005 | Wolrich et al. |
| 7,433,258 B2 | 10/2008 | Rao et al. | 2005/0166006 A1 | 7/2005 | Talbot et al. |
| 2001/0000822 A1 | 5/2001 | Dell et al. ................. 711/170 | 2005/0177677 A1 | 8/2005 | Jeddeloh |
| 2001/0003839 A1 | 6/2001 | Kondo ..................... 711/144 | 2005/0177690 A1 | 8/2005 | LaBerge ..................... 711/154 |
| 2001/0029566 A1 | 10/2001 | Shin | 2005/0204216 A1 | 9/2005 | Daily et al. ................. 714/724 |
| 2002/0019926 A1 | 2/2002 | Huppenthal et al. ........... 712/15 | 2005/0216678 A1 | 9/2005 | Jeddeloh |
| 2002/0038405 A1 | 3/2002 | Leddige et al. ............. 711/115 | 2005/0220097 A1 | 10/2005 | Swami et al. |
| 2002/0059439 A1 | 5/2002 | Arroyo et al. | 2005/0223196 A1 | 10/2005 | Knowles |
| 2002/0083255 A1 | 6/2002 | Greeff et al. ................. 710/305 | 2005/0229132 A1 | 10/2005 | Butt et al. ..................... 716/10 |
| 2002/0103988 A1 | 8/2002 | Dornier ..................... 712/38 | 2005/0248997 A1 | 11/2005 | Lee |
| 2002/0112119 A1 | 8/2002 | Halbert et al. ............. 711/115 | 2005/0257005 A1 | 11/2005 | Jeddeloh |
| 2002/0112194 A1 | 8/2002 | Uzelac ..................... 713/500 | 2005/0259496 A1 | 11/2005 | Hsu et al. ..................... 365/226 |
| 2002/0124195 A1 | 9/2002 | Nizar ..................... 713/320 | 2005/0289292 A1 | 12/2005 | Morrow et al. |
| 2002/0124201 A1 | 9/2002 | Edwards et al. | 2005/0289377 A1 | 12/2005 | Luong |
| 2002/0147898 A1 | 10/2002 | Rentschler et al. .......... 711/170 | 2006/0036826 A1 | 2/2006 | Dell et al. |
| 2002/0174274 A1 | 11/2002 | Wu et al. ..................... 710/100 | 2006/0036827 A1 | 2/2006 | Dell et al. |
| 2003/0009632 A1 | 1/2003 | Arimilli et al. | 2006/0080584 A1 | 4/2006 | Hartnett et al. |
| 2003/0028701 A1 | 2/2003 | Rao et al. | 2006/0085602 A1 | 4/2006 | Huggahalli et al. |
| 2003/0033364 A1 | 2/2003 | Garnett et al. ............. 709/203 | 2006/0095592 A1 | 5/2006 | Borkenhagen |
| 2003/0051055 A1 | 3/2003 | Parrella et al. | 2006/0095679 A1 | 5/2006 | Edirisooriya |

| | | | |
|---|---|---|---|
| 2006/0107175 A1 | 5/2006 | Dell et al. | |
| 2006/0112238 A1 | 5/2006 | Jamil et al. | |
| 2006/0161733 A1 | 7/2006 | Beckett et al. | |
| 2006/0162882 A1 | 7/2006 | Ohara et al. | |
| 2006/0168407 A1 | 7/2006 | Stern | |
| 2006/0179208 A1 | 8/2006 | Jeddeloh | |
| 2006/0190674 A1 | 8/2006 | Poechmueller | |
| 2006/0195631 A1 | 8/2006 | Rajamani | |
| 2006/0206742 A1 | 9/2006 | James | |
| 2006/0212666 A1 | 9/2006 | Jeddeloh | |
| 2006/0277365 A1 | 12/2006 | Pong | |
| 2006/0288172 A1 | 12/2006 | Lee et al. | |
| 2007/0005922 A1 | 1/2007 | Swaminathan et al. | |
| 2007/0025304 A1 | 2/2007 | Leelahakriengkrai et al. | |
| 2007/0038907 A1 | 2/2007 | Jeddeloh et al. | |
| 2007/0067382 A1 | 3/2007 | Sun | |
| 2007/0083701 A1 | 4/2007 | Kapil | |
| 2008/0043808 A1 | 2/2008 | Hsu et al. | |
| 2008/0162807 A1 | 7/2008 | Rothman et al. | |
| 2008/0222379 A1 | 9/2008 | Jeddeloh | |

FOREIGN PATENT DOCUMENTS

| | | | |
|---|---|---|---|
| EP | 0470734 A1 | 2/1992 | |
| EP | 0899743 A2 | 6/1998 | |
| EP | 1429340 A2 | 6/2004 | |
| GB | 2396711 A | 6/2004 | |
| JP | 59153353 A | 9/1984 | |
| JP | 0114140 A | 6/1989 | |
| JP | 0432614 | 11/1992 | |
| JP | 10011971 | 1/1998 | |
| JP | 2004139552 A | 5/2004 | |
| JP | 2008003711 A | 1/2008 | |
| WO | 9621188 | 7/1996 | |
| WO | 9812651 | 3/1998 | |
| WO | 0223353 A2 | 3/2002 | |
| WO | WO2005038660 | 4/2005 | |
| WO | 2007109888 | 10/2007 | |

OTHER PUBLICATIONS

Rosenberg, "Dictionary of Computers, Information Processing & Telecommunications", Second Edition, John Wiley & Sons, Inc. 1987. 3 pgs.
Sivencrona et al.; "RedCAN™: Simulations of two Fault Recovery Algorithm for CAN;" Proceedings for the 10th IEEE Pacific Rim International Symposium on Dependable Computing (PRDC'04); 2005.
Jungjoon Kim et al.; "Performance and Architecture Features of Segmented Multiple Bus System;" IEEE Computer Society; 1999 International Conference on Parallel Processing (ICPP '99).
Ghoneima et al.; "Optimum Positioning of Interleaved Repeaters in Bidirectional Buses;" IEEE Transactions on Computer-Aided Design of Integrated Circuits and Systems, vol. 25, No. 3, Mar. 2005, pp. 461-469.
Seceleanu et al.; "Segment Arbiter as Action System;" IEEE 2003 pp. 249-252.
Understanding System Memory and CPU Speeds: A Layman's Guide to the Front Side Bus (FSB), [online]; [retrieved on Feb. 23, 2006]; retrieved from the Internet http://www.directron.com/fsbguide.html.
JEDEC Solid State Technology Association, "JEDEC Standard: DDR2 SDRAM Specification", Jan. 2004, JEDEC, Revision JESD79-2A, p. 10.
Brown, et al "Compiler-Based I/O Prefetching for Out-of-Core Applications", ACM Transactions on Computer Systems, vol. 19, No. 2, May 2001, pp. 111-170.
Wang, et al., "Guided Region Prefetching: A Cooperative Hardware/Software Approach", pp. 388-398.
Natarajan, et al., "A Study of Performance Impact on Memory Controller Features in Multi-Processor Server Environment", pp. 80-87.
Nilsen, "High-Level Dynamic Memory Management for Object-Oriented Real-Time Systems", pp. 86-93.
Massoud Pedram, "Power Minimization in IC Design Principles and Applications", ACM Transactions on Design Automation of Electronic Systems vol. 1, No. 1, Jan. 1996, pp. 3-56.
P.R. Panda, "Data and Memory Optimization Techniques For Embedded Systems", ACM Transactions on Design Automation of Electronic Systems, vol. 6, No. 2, Apr. 2001, pp. 149-206.
PCT Search Report. PCT/EP2007/057915. Mailed Nov. 7, 2007.
PCT International Search Report PCT/EP2006/068984. Mailed Feb. 16, 2007.
PCT International Search Report PCT/EP2007/057916. Mailed Dec. 14, 2007.
International Search Report, International Application No. PCT/EP2007/054929, International Publication Number WO 2007/135144 A1.
Joe Jeddeloh, Fully Buffered DIMM (FB-DIMM), XP002490174, Advanced Systems Technology, Micron Technology, Inc. Apr. 16, 2008, 32 pages.
Timothy J. Dell, "The RAS Implications of DIMM Connector Failure Rates in Large, Highly Available Server Systems", The 53rd IEEE Holm Conference on Electrical Contacts, IEEE, Sep. 16-19, 2007, pp. 256-261.
"Using Dual and Mappable Spare Bus", XP000433763, IBM Technical Disclosure Bulletin, vol. 37, No. 2B, IBM Copr., NY, US, Feb. 1, 1994, pp. 59-63.
"Novel Bus Reconfiguration Scheme With Spare Lines", XP000676205, IBM Technical Disclosure Bulletin, vol. 29, No. 12, IBM Copr., NY, US, May 12, 1987, pp. 5590-5593.
European Search Report, European Patent Application 05106700.7.
Yang, Q.; Bhuyan, L.N., "Analysis of packet-switched multiple-bus multiprocessor systems," Computers, IEEE Transactions on, vol. 40, No. 3, pp. 352-357, Mar. 1991.
Li, P; Martinez, J.; Tang, J.; Priore, S.,; Hubbard, K.; Jie Xue; Poh, E.; Ong MeiLin; Chok KengYin; Hallmark, C.; Mendez, D.; "Development and evaluation of a high performance fine pitch SODIMM socket package." Electronic Components and Technology Conference, 2004. Proceedings. 54th, vol. 1, pp. 1161-1166, Jun. 1-4, 2004.
International Search Report, International Patent Application No. PCT/US07/75944, mailed Sep. 23, 2006, 3 pages.
European Search Report, European Patent Application No. 05106701.5, mailed Oct. 7, 2008, 5 pages.
European Search Report, European Patent Application No. 05109837.4, mailed Oct. 7, 2008, 5 pages.
Boudon, et al., "Novel Bus Reconfiguration Scheme With Spare Lines", IBM Technical Disclosure Bulletin, May 1987, vol. 29, No. 12, pp. 1-3.
NB940259 (IBM Technical Disclosure Bulletin, Feb. 1994; vol. 37; pp. 59-64).
Singh, S., et al., "Bus Sparing for Fault-Tolerant System Design", IBM Technical Disclosure Bulletin, Dec. 1991, vol. 34, No. 71, pp. 117-118.
U.S. Appl. No. 11/419,586 filed May 22, 2006. Robert Tremaine. "Systems and Methods for Providing Remote Pre-Fetch Buffers".

\* cited by examiner

Packet Structure

| Channel Lanes | | | | | | | | | | | | | | | | | | | |
|---|---|---|---|---|---|---|---|---|---|---|---|---|---|---|---|---|---|---|---|
| 18 | 17 | 16 | 15 | 14 | 13 | 12 | 11 | 10 | 9 | 8 | 7 | 6 | 5 | 4 | 3 | 2 | 1 | 0 | |
| | ECC | | | | | | | STS | | CMD | | | TAG | | | | | |

Data

Transfer: 0, 1, 2, 3, 4, 5, 6, 7

FIG. 8

SYSTEMS AND METHODS FOR PROVIDING DISTRIBUTED TECHNOLOGY INDEPENDENT MEMORY CONTROLLERS

BACKGROUND OF THE INVENTION

This invention relates generally to computer memory, and more particularly to systems and methods for providing a distributed memory controller that is independent of a particular memory technology.

Contemporary high performance computing main memory systems are generally composed of one or more dynamic random access memory (DRAM) devices, which are connected to one or more processors via one or more memory control elements. Overall computer system performance is affected by each of the key elements of the computer structure, including the performance/structure of the processor(s), any memory cache(s), the input/output (I/O) subsystem(s), the efficiency of the memory control function(s), the main memory device(s), and the type and structure of the memory interconnect interface(s).

Extensive research and development efforts are invested by the industry, on an ongoing basis, to create improved and/or innovative solutions to maximizing overall system performance and density by improving the memory system/subsystem design and/or structure. High-availability systems present further challenges as related to overall system reliability due to customer expectations that new computer systems will markedly surpass existing systems in regard to mean-time-between-failure (MTBF), in addition to offering additional functions, increased performance, increased storage, lower operating costs, etc. Other frequent customer requirements further exacerbate the memory system design challenges, and include such items as ease of upgrade and reduced system environmental impact (such as space, power and cooling).

FIG. 1 relates to U.S. Pat. No. 5,513,135 to Dell et al., of common assignment herewith, and depicts an early synchronous memory module. The memory module depicted in FIG. 1 is a dual in-line memory module (DIMM). This module is composed of synchronous DRAMs 8, buffer devices 12, an optimized pinout, and an interconnect and capacitive decoupling method to facilitate high performance operation. The patent also describes the use of clock re-drive on the module, using such devices as phase-locked loops (PLLs).

FIG. 2 relates to U.S. Pat. No. 6,173,382 to Dell et al., of common assignment herewith, and depicts a computer system 10 which includes a synchronous memory module 20 that is directly (i.e. point-to-point) connected to a memory controller 14 via a bus 40, and which further includes logic circuitry 24 (such as an application specific integrated circuit, or "ASIC") that buffers, registers or otherwise acts on the address, data and control information that is received from the memory controller 14. The memory module 20 can be programmed to operate in a plurality of selectable or programmable modes by way of an independent bus, such as an inter-integrated circuit (12C) control bus 34, either as part of the memory initialization process or during normal operation. When utilized in applications requiring more than a single memory module connected directly to a memory controller, the patent notes that the resulting stubs can be minimized through the use of field-effect transistor (FET) switches to electrically disconnect modules from the bus.

Relative to U.S. Pat. No. 5,513,135, U.S. Pat. No. 6,173,382 further demonstrates the capability of integrating all of the defined functions (address, command, data, presence detect, etc) into a single device. The integration of functions is a common industry practice that is enabled by technology improvements and, in this case, enables additional module density and/or functionality.

FIG. 3, from U.S. Pat. No. 6,510,100 to Grundon et al., of common assignment herewith, depicts a simplified diagram and description of a memory system 10 that includes up to four registered DIMMs 40 on a traditional multi-drop stub bus. The subsystem includes a memory controller 20, an external clock buffer 30, registered DIMMs 40, an address bus 50, a control bus 60 and a data bus 70 with terminators 95 on the address bus 50 and the data bus 70. Although only a single memory channel is shown in FIG. 3, systems produced with these modules often included more than one discrete memory channel from the memory controller, with each of the memory channels operated singly (when a single channel was populated with modules) or in parallel (when two or more channels were populated with modules) to achieve the desired system functionality and/or performance.

FIG. 4, from U.S. Pat. No. 6,587,912 to Bonella et al., depicts a synchronous memory module 210 and system structure in which the repeater hubs 320 include local re-drive of the address, command and data to the local memory devices 301 and 302 via buses 321 and 322; generation of a local clock (as described in other figures and the patent text); and the re-driving of the appropriate memory interface signals to the next module or component in the system via bus 300.

In previous system structures, such as those described in the above references, maintaining the memory controller functions external to the processor chip made it possible to develop a relatively simple memory controller device to adapt any memory technology to the processor. This allowed the design of the processor to be completed relatively independently of the memory technology(ies) and gave the system designers the flexibility to match one or more of several processors to the a selected memory technology and/or subsystem for each of many targeted markets.

Due to the rapid increase in logic circuit capacity of silicon chips, most processor designs are now migrating to higher levels of integration, with an increasing percentage of the computer system elements being incorporated on the processor chip itself. The resulting processors will enable the construction of systems in which there are few, if any, external logic support chips required to build a computer system. This integration trend offers improved performance while reducing the cost, physical space, and power required for the overall computer system. One of the elements being migrated onto the processor chip(s) is the memory controller.

With the integration of the memory controller(s) into the processor(s), resulting systems will see improved performance due to the close proximity to the processor of the memory control function, the internal caches and the coherency buses. While this move is advantageous at a system level, it also results in a linkage of the processor to an individual memory technology or to a small subset of memory technologies. This linkage has the secondary effect of coupling the development and release of new memory products to the development and release of new processors. This coupling has caused problems in regard to the timing of computer system introductions to the optimum, cost-effective memory technology. For example, this coupling may result in systems that are closely linked to an emerging memory technology that has been modified, during development, to the point that it is no longer compatible with the processor, is being phased out due to the introduction of a more advanced technology, or is still an emerging technology which has not yet been broadly adopted (introducing cost and supply risk exposures).

Therefore, what is needed is the ability to distribute memory controller functions between a processor and a memory subsystem(s) in a manner such that the memory controller retains a close linkage to the internal coherency buses and cache structure of the processor, while eliminating the linkage to a specific memory technology.

BRIEF SUMMARY OF THE INVENTION

Embodiments include a computer memory system for storing and retrieving data. The system includes a memory bus, a main memory controller, one or more memory devices characterized by memory device protocols and signaling requirements, and one or more memory hub devices. The main memory controller is in communication with the memory bus for generating, receiving, and responding to memory access requests. The hub devices are in communication with the memory bus and with the memory devices for controlling the memory devices responsively to the memory access requests received from the main memory controller and for responding to the main memory controller with state or memory data. The main memory controller and the hub devices communicate via the memory bus in messages in a message format and protocol for indicating memory read, memory write, memory system power management and control that is independent of the memory device protocols and signaling requirements.

Embodiments also include a memory system including at least one main memory controller, a memory bus in communication with the main memory controller and a memory subsystem. The memory subsystem includes a hub device and is in communication with the memory bus for connecting the main memory controller to the memory subsystem. At least one main memory controller provides operational information to the hub device in a technology-independent format and the hub device converts the information into a technology-dependent format that is consistent with operational specifications associated with one or more memory devices attached to the memory subsystem. Information returned to the memory controller includes one or more tag bits to correlate the information to one or more of a requested memory operation, the memory subsystem and the hub device.

Further embodiments include a method of storing and retrieving data in a processing system. The method includes receiving a technology-independent memory access request from a main memory controller, where the memory access request is received at a hub device in a memory subsystem via a memory bus. The memory access request is converted into a technology-dependent format that is consistent with operational specifications associated with one or more memory devices attached to the memory subsystem. The memory access request is executed at the memory subsystem. If the memory access request requires a response, then the response is generated including tag bits for use by the main memory controller in correlating the response to one or more of the memory access request, the memory subsystem, and the hub device.

Embodiments further include a memory subsystem including a hub logic device and one or more memory devices in communication with the hub logic device. The hub logic device receives commands in a technology-independent format from one or more requesters and converts the commands into a technology-dependent format that is consistent with operational specifications associated with the memory devices. If a command requires a response then the hub logic device generates the response including one or more tag bits for correlating the response to one or more of the command and the hub logic device.

Still further embodiments include a computer system including at least one main memory controller, a memory subsystem including a hub logic device and one or more memory devices, and a communication bus which connects the main memory controller(s) to the memory subsystem. The main memory controller(s) provides commands including requested memory operations to the hub logic device in a technology-independent format and the hub logic device converts the commands into a technology-dependent format that is consistent with operational specifications associated with the memory devices. Information returned to the main memory controller from the memory subsystem includes one or more tag bits to correlate the information to one or more of a requested memory operation and the memory subsystem.

Still further embodiments include a hub logic device with a memory device interface and interface logic. The memory device interface converts technology independent memory access requests into technology dependent memory access requests consistent with operational specifications associated with one or more memory devices in communication with the hub logic device. The interface logic receives the technology independent memory access requests from one or more requesters. If a memory access request requires a response, then the interface logic generates the response including one or more tag bits for correlating the response to the memory access request.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES:

FIG. 8 depicts an exemplary packet structure that may be implemented by exemplary embodiments.

DETAILED DESCRIPTION OF EXEMPLARY EMBODIMENTS

Exemplary embodiments provide an innovative approach to integrating memory controllers and computer processors by providing memory controllers that include distributed memory controller functions and that are memory technology independent. Exemplary embodiments include memory systems comprised of one or more memory modules with memory devices. The memory modules also include memory device and/or memory module technology-specific functions located, for example, on a hub logic chip on the memory module. Several of these technology specific functions are typically associated with memory controller functions and these functions have been moved from the memory controller into the memory modules. The resulting memory controller, referred to herein as a main memory controller, no longer contains memory device and/or memory module technology specific functions. In exemplary embodiments, the main memory controller is located on the processor, and is utilized to initiate and receive memory commands to and from the processor. Thus, the memory system structure provides distributed memory control and a technology-independent main memory controller. The technology independent main memory controller may be integrated into the processor, be implemented in a standalone device, be integrated into alternate system logic, and/or be included as one of several devices on a multi-chip carrier.

In exemplary embodiments, the processor issues high-level requests for read and/or write operations (via the main memory controller) to the memory modules that then execute the commands to transfer data packets to and from their attached or otherwise connected memory devices. Each memory module executes the commands targeted for its memory devices transparently and independently of the other memory modules on the cascade interconnect bus. Using data buffers in the hub logic chip and packet identification tags, the memory modules return read data at a time unpredicted by the processor, and at a time that may preempt an earlier issued read request without losing or corrupting any of the read data returned on the bus. The packet identification tags permit the processor to identify all read data returned to it, independent from the order in which the command was issued.

Figure 5:
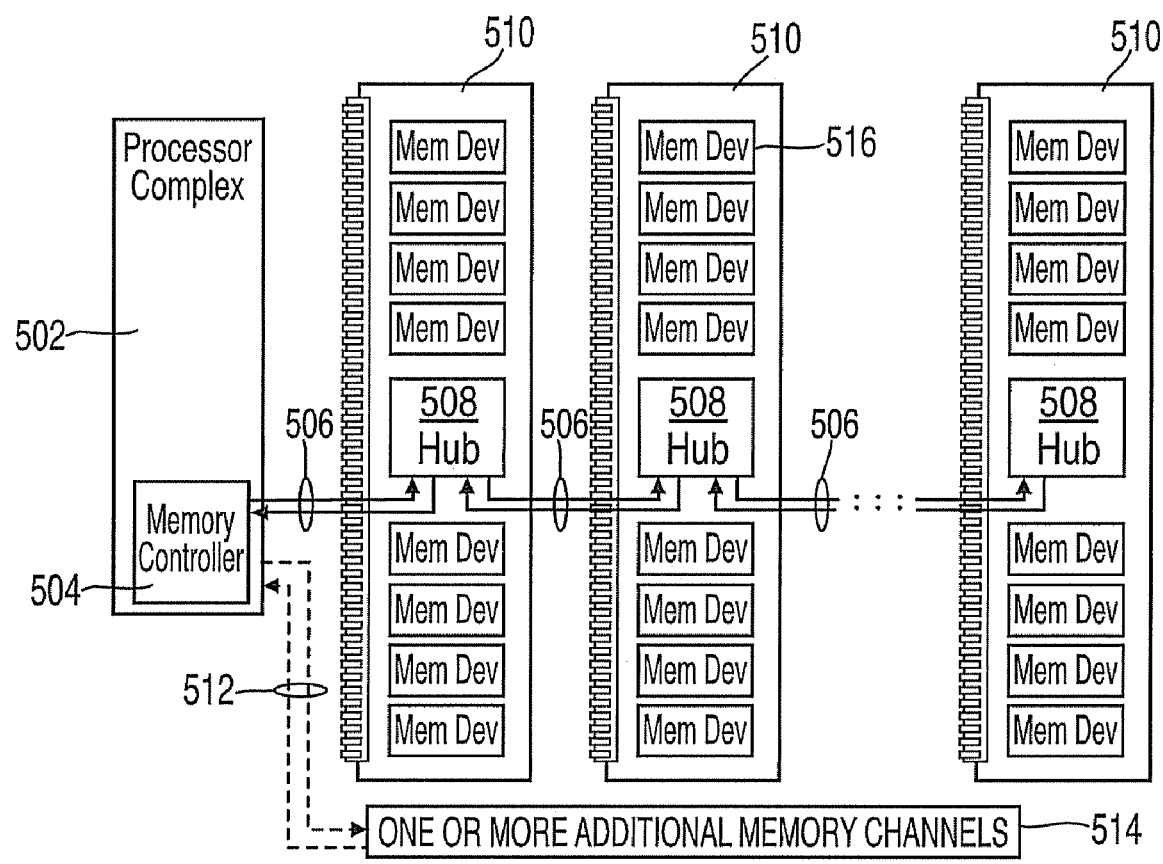
FIG. 5 depicts a memory system having one or more memory channels and distributed independent memory controllers interconnected by one or more cascade interconnect buses that may be implemented by exemplary embodiments.

Exemplary embodiments apply to memory systems constructed of one or more memory subsystems, with the memory subsystems generally implemented in the form of memory modules with hub logic chips, or buffer devices, which are connected to a processor complex by a cascade interconnect bus 506 as depicted in FIG. 5. In alternate exemplary embodiments, the memory modules 510 (also referred to as memory subsystems due to the inclusion of memory devices 516 and associated memory interface circuitry, in for example, a hub logic chip 508) are connected to the processor complex 502 by one or more busses 506. The memory modules 510 depicted in FIG. 5 contain both a hub logic chip 508 that contains the technology-specific memory controller functions and a first interface to the main memory controller 504 in the processor complex 502 (containing one or more processors) via a cascade-interconnect memory bus 506 (shown in the exemplary embodiment as including an upstream bus and a downstream bus). The memory modules 510 also include one or more memory devices 516 that are connected to the hub logic chip 508 via a second interface. A third interface may also exist on the hub logic chip 508, especially in the case of a cascade interconnect bus 506, to re-drive information such as address, command and data information to one or more memory modules 510 located downstream from the first memory module 510, as well as to receive and re-drive data and/or error, status and other operational information intended for an upstream memory module 510 or the main memory controller 504.

Figure 1:
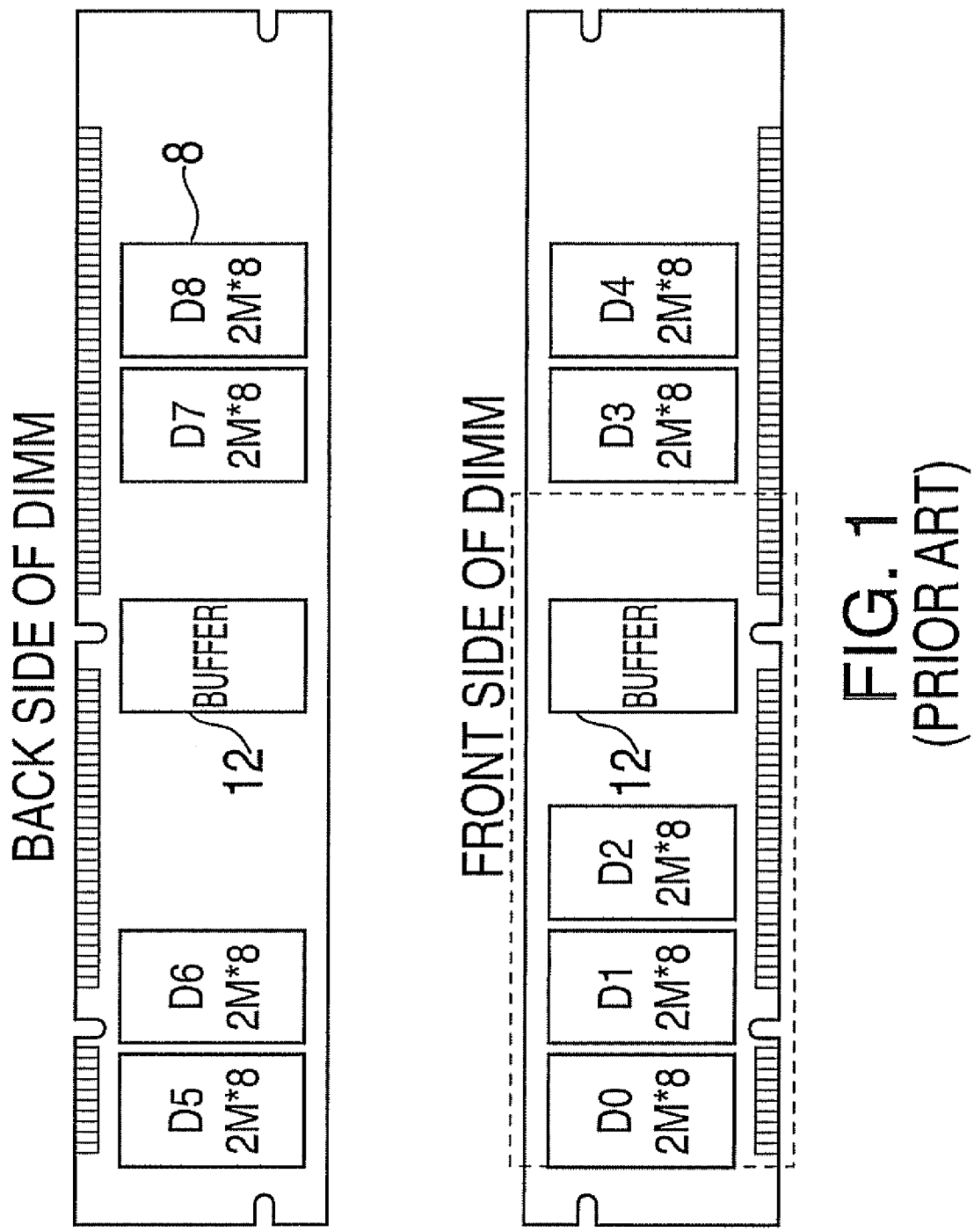
FIG. 1 depicts an exemplary early synchronous memory module.
Figure 2:
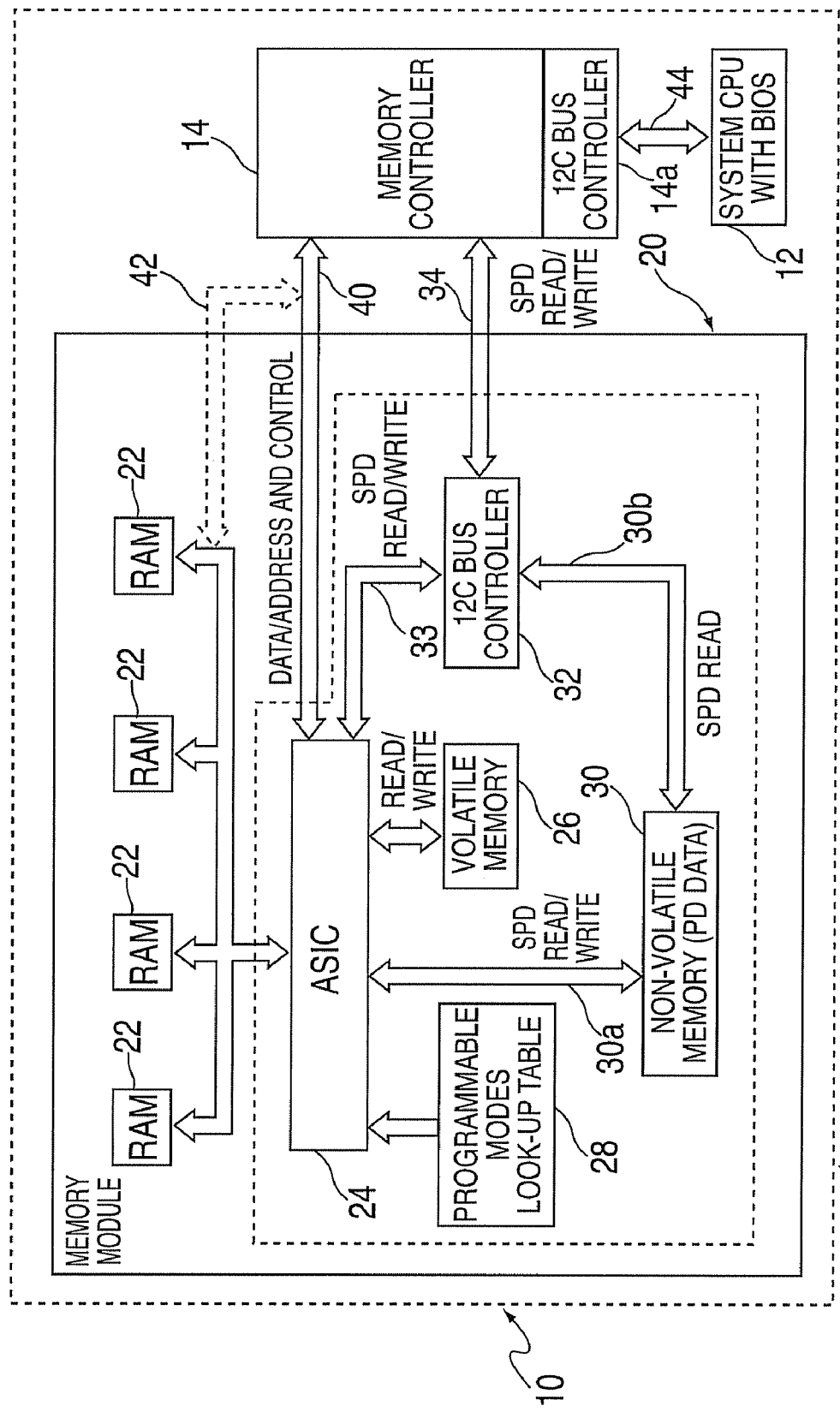
FIG. 2 depicts an exemplary computer system with a fully buffered synchronous memory module that is directly connected to a memory controller.
Figure 3:
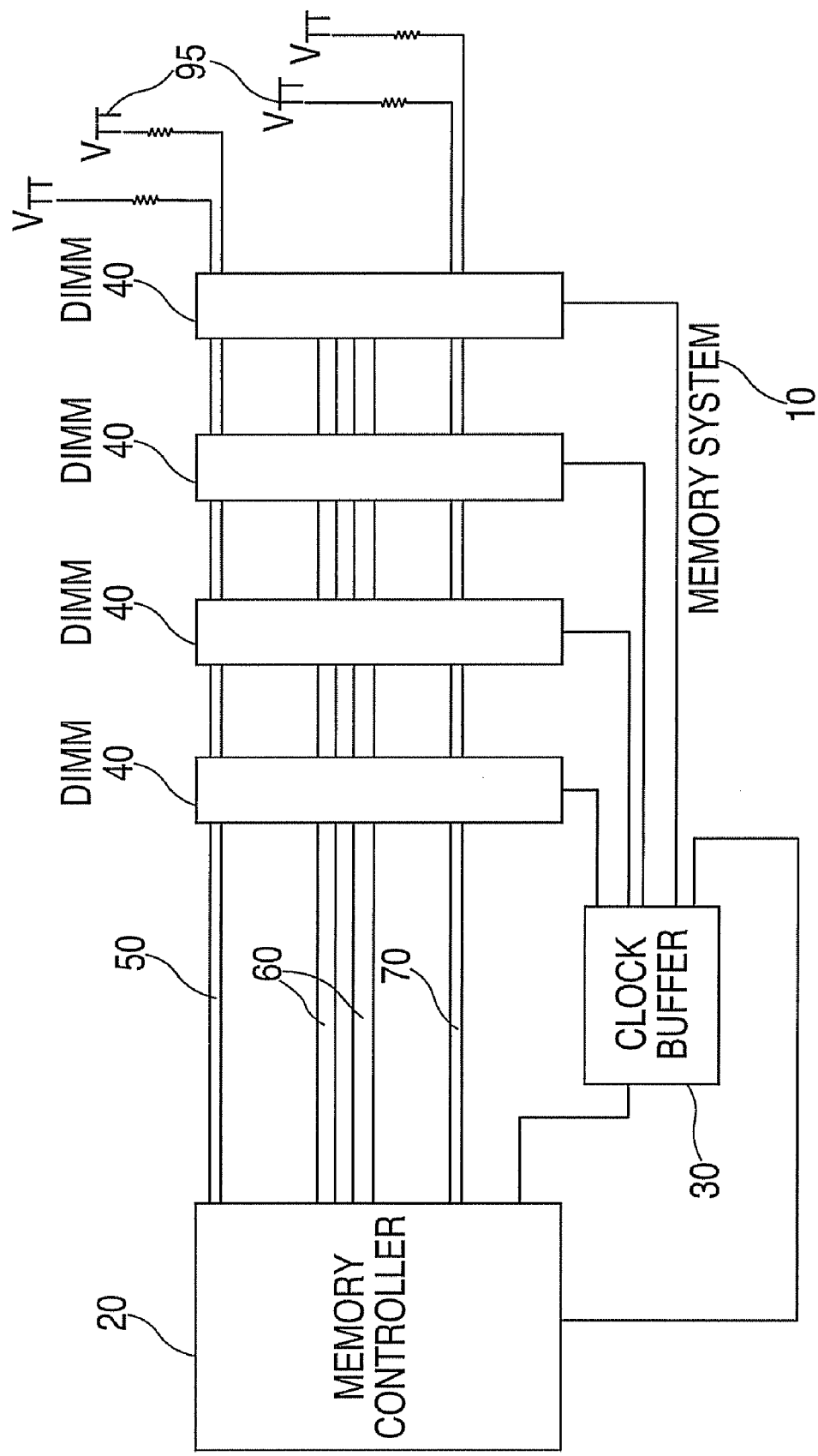
FIG. 3 depicts an exemplary memory system, shown with a single, traditional multi-drop stub bus.
Figure 4:
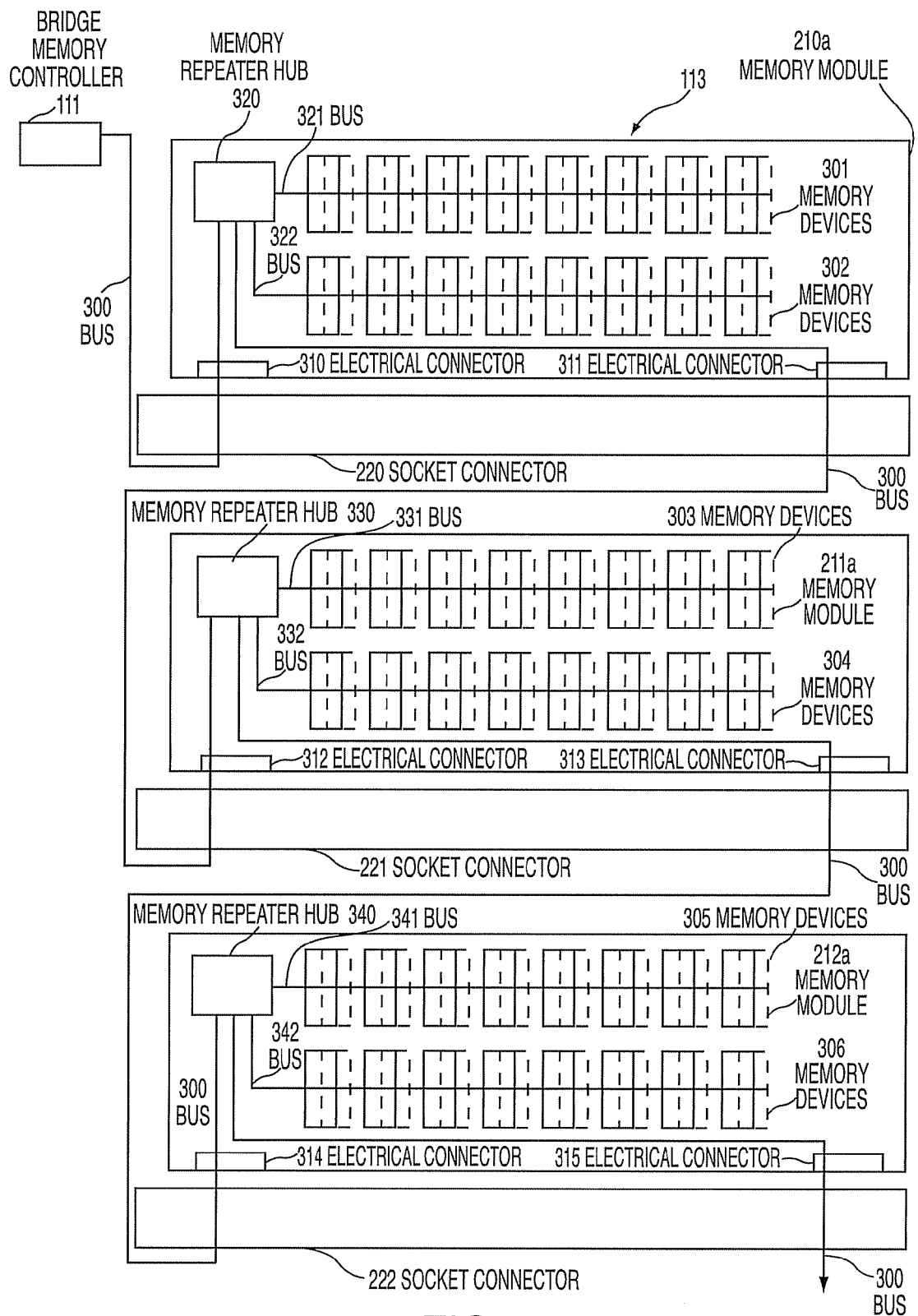
FIG. 4 depicts a fully buffered synchronous memory module and system structure, where the fully buffered synchronous memory module includes a repeater function.

The memory modules 510 may be implemented in a variety of technologies including a DIMM, a single in-line memory module (SIMM) and/or other memory module or card structures. In general, a DIMM refers to a small circuit board which is comprised primarily of random access memory (RAM) integrated circuits or die on one or both sides with signal and/or power pins on both sides of the board. This can be contrasted to a SIMM which is a small circuit board or substrate composed primarily of RAM integrated circuits or die on one or both sides and single row of pins along one long edge. The DIMM depicted in FIG. 1 includes 168 pins in the exemplary embodiment, whereas subsequent DIMMs have been constructed with pincounts ranging from 100 pins to over 300 pins. In the exemplary embodiment, the memory module is constructed with 240 pins, although more or less interconnections may be included in an alternate embodiment, based on the system application objectives.

In exemplary embodiments, the memory bus 506 is constructed using multi-drop connections to the memory modules 510 and/or using point-to-point connections (as shown in FIG. 5). The downstream portion of the controller interface (or memory bus 506), referred to as the downstream bus, may include command, address, data and other operational, initialization or status information being sent to the memory modules 510. Each memory module 510 may simply forward the information to the subsequent module(s) 510 via bypass circuitry; receive, interpret and re-drive the information if it is determined to be targeting a downstream memory module 510; re-drive some or all of the information without first interpreting the information to determine the intended recipient; or perform a subset or combination of these options.

The upstream portion of the memory bus 506, referred to as the upstream bus, returns requested read data and/or error, status or other operational information, and this information may be forwarded to the subsequent memory module(s) 510 via bypass circuitry; be received, interpreted and re-driven if it is determined to be targeting an upstream memory module 510 and/or main memory controller 504 in the processor complex 502; be re-driven in part or in total without first interpreting the information to determine the intended recipient; or perform a subset or combination of these options.

Exemplary embodiments may be utilized by a single level memory system having only a single memory module 510, or memory subsystem, which is directly connected (such as via one or more point-to-point interconnections) to the main memory controller 504, with or without additional memory subsystem positions connected in a cascade interconnect or multi-drop structure. In additional exemplary embodiments, the main memory controller 504 includes more than one memory channel (see for e.g., bus 512 in FIG. 5), with each memory channel often comprised of one or more upstream and downstream buses 506 and 512 operating in a like manner; with the main memory controller 504 operating in a parallel or independent manner for each memory bus 506 and 512; and/or with each memory bus 506 and 512 including the same or a different number of installed memory modules 510.

In exemplary embodiments, the memory system includes more than one memory module 510, with subsequent memory modules 510 communicating to the main memory controller 504 by way of or independent of the first memory module 510. In exemplary embodiments, such as the one depicted in FIG. 5, the main memory controller 504 is in communication with the first memory module 510 via a point-to-point bus, with the bus cascade-connected to a second (subsequent) memory module 510 via re-drive circuitry in the first memory module 510 (e.g., via circuitry in the hub logic chip 508). Third and fourth (and greater) memory modules 510 may be connected via a similar method, with the re-drive circuitry included in the memory module 510 located prior to that memory module 510 on the memory bus 506.

In alternate exemplary embodiments, the point-to-point bus includes a switch or bypass mechanism which results in the bus information being directed to one of two or more possible memory modules 510 during downstream communication (communication passing from the main memory controller 504 to a memory module 510), as well as directing upstream information (communication from a memory module 510 to the main memory controller 504) to the main memory controller 504 itself, often by way of one or more upstream memory modules 510. Further embodiments include the use of continuity modules, such as those recognized in the art, which, for example, can be placed between the memory controller and a first populated memory module, in a cascade interconnect memory system, such that any intermediate module positions between the memory controller and the first populated memory module include a means by which information passing between the memory controller and the first populated memory module position can be received even if the one or more intermediate module position(s) do not include a memory module. The continuity module(s) may be installed in any module position(s), subject to any bus restrictions, including the first position (closest to the main memory controller, the last position (prior to any included termination) or any intermediate position(s). The use of continuity modules may be especially beneficial in a multi-module cascade interconnect bus structure, where an intermediate memory module is removed and replaced by a continuity module, such that the system continues to operate after the removal of the intermediate memory module. In more common embodiments, the continuity module(s) would include either interconnect wires to transfer all required signals from the input(s) to the corresponding output(s), or be re-driven through a repeater device. The continuity module(s) might further include a non-volatile storage device (such as an EEPROM), but would not include main memory storage devices.

In exemplary embodiments, the memory system includes one or more memory modules 510 connected to the main memory controller 504 via a cascade interconnect memory bus 506, however other memory structures may be implemented such as a point-to-point bus, a multi-drop memory bus or a shared bus. Depending on the signaling methods used, the target operating frequencies, space, power, cost, and other constraints, various alternate bus structures may be considered. A point-to-point bus may provide the optimal performance in systems produced with electrical interconnections, due to the reduced signal degradation that may occur as compared to bus structures having branched signal lines, switch devices or stubs. However, when used in systems requiring communication with multiple devices or subsystems, this method will often result in significant added component cost and increased system power, and may reduce the potential memory density due to the need for intermediate buffering and/or re-drive.

Performances similar to those obtained from point-to-point bus structures can be obtained by adding switch devices. These and other solutions offer increased memory packaging density at lower power, while retaining many of the characteristics of a point-to-point bus. Multi-drop busses provide an alternate solution, albeit often limited to a lower operating frequency, but at a cost/performance point that may be advantageous for many applications. Optical bus solutions permit significantly increased frequency and bandwidth potential, either in point-to-point or multi-drop applications, but may incur cost and space impacts.

As used herein the term "buffer" or "buffer device" refers to a temporary storage unit (as in a computer), especially one that accepts information at one rate and delivers it another. In exemplary embodiments, a buffer is an electronic device that provides compatibility between two signals (e.g., changing voltage levels or current capability). The term "hub" is sometimes used interchangeably with the term "buffer." A hub is a device containing multiple ports that is connected to several other devices. A port is a portion of an interface that serves a congruent I/O functionality (e.g., a port may be utilized for sending and receiving data, address, and control information over one of the point-to-point links, or busses). A hub may be a central device that connects several systems, subsystems, or networks together. A passive hub may simply forward messages, while an active hub, or repeater, amplifies and refreshes the stream of data which otherwise would deteriorate over a distance. The term hub logic chip 508, as used herein, refers to a hub chip that includes logic (hardware and/or software) for performing memory functions.

Also as used herein, the term "bus" refers to one of the sets of conductors (e.g., wires, and printed circuit board traces or connections in an integrated circuit) connecting two or more functional units in a computer. The data bus, address bus and control signals, despite their names, constitute a single bus since each are often useless without the others. A bus may include a plurality of signal lines, each signal line having two or more connection points, that form a main transmission path that electrically connects two or more transceivers, transmitters and/or receivers. The term "bus" is contrasted with the term "channel" which is often used to describe the function of a "port" as related to a memory controller in a memory system, and which may include one or more busses or sets of busses. The term "channel" as used herein refers a port on a memory controller. Note that this term is often used in conjunction with I/O or other peripheral equipment, however the term channel has been adopted by some to describe the interface between a processor or memory controller and one of one or more memory subsystem(s).

Further, as used herein, the term "daisy chain" refers to a bus wiring structure in which, for example, device A is wired to device B, device B is wired to device C, etc. The last device is typically wired to a resistor or terminator. All devices may receive identical signals or, in contrast to a simple bus, each device may modify one or more signals before passing them on. A "cascade" or cascade interconnect' as used herein refers to a succession of stages or units or a collection of interconnected networking devices, typically hubs, in which the hubs operate as a logical repeater, further permitting merging data to be concentrated into the existing data stream. Also as used herein, the term "point-to-point" bus and/or link refers to one or a plurality of signal lines that may each include one or more terminators. In a point-to-point bus and/or link, each signal line has two transceiver connection points, with each transceiver connection point coupled to transmitter circuitry, receiver circuitry or transceiver circuitry. A signal line refers to one or more electrical conductors or optical carriers, generally configured as a single carrier or as two or more carriers, in a twisted, parallel, or concentric arrangement, used to transport at least one logical signal.

Memory devices are generally defined as integrated circuits that are composed primarily of memory (storage) cells, such as DRAMs (Dynamic Random Access Memories), SRAMs (Static Random Access Memories), FeRAMs (Ferro-Electric RAMs), MRAMs (Magnetic Random Access Memories), Flash Memory and other forms of random access and related memories that store information in the form of electrical, optical, magnetic, biological or other means.

Dynamic memory device types may include asynchronous memory devices such as FPM DRAMs (Fast Page Mode Dynamic Random Access Memories), EDO (Extended Data Out) DRAMs, BEDO (Burst EDO) DRAMs, SDR (Single Data Rate) Synchronous DRAMs, DDR (Double Data Rate) Synchronous DRAMs or any of the expected follow-on devices such as DDR2, DDR3, DDR4 and related technologies such as Graphics RAMs, Video RAMs, LP RAM (Low Power DRAMs) which are often based on the fundamental functions, features and/or interfaces found on related DRAMs.

Memory devices may be utilized in the form of chips (die) and/or single or multi-chip packages of various types and configurations. In multi-chip packages, the memory devices may be packaged with other device types such as other memory devices, logic chips, analog devices and programmable devices, and may also include passive devices such as resistors, capacitors and inductors. These packages may include an integrated heat sink or other cooling enhancements, which may be further attached to the immediate carrier or another nearby carrier or heat removal system.

Module support devices (such as buffers, hubs, hub logic chips, registers, PLL's, DLL's, non-volatile memory, etc) may be comprised of multiple separate chips and/or components, may be combined as multiple separate chips onto one or more substrates, may be combined onto a single package or even integrated onto a single device—based on technology, power, space, cost and other tradeoffs. In addition, one or more of the various passive devices such as resistors, capacitors may be integrated into the support chip packages, or into the substrate, board or raw card itself, based on technology, power, space, cost and other tradeoffs. These packages may include an integrated heat sink or other cooling enhancements, which may be further attached to the immediate carrier or another nearby carrier or heat removal system.

Current computer systems include a processor with a technology specific memory controller attached to one or more multi-drop or point-to-point busses with one or more memory modules connected in either a shared bus structure or with a cascade interconnect bus. The memory modules contain buffer or hub logic chips that interface between the bus and the actual memory on the modules. The functions included in the hub logic chips may include level translation, speed matching, temporary data storage, and other functions associated with the flow of data, addresses and/or commands between the memory controller and the memory devices located on the memory modules. Since these hubs, or hub logic chips, do not contain any high-level memory control functions, the memory controller must be designed consistent with the functional specifications associated with the memory devices on the modules so that the commands and command sequences/streams do not violate the device specifications.

Figure 6:
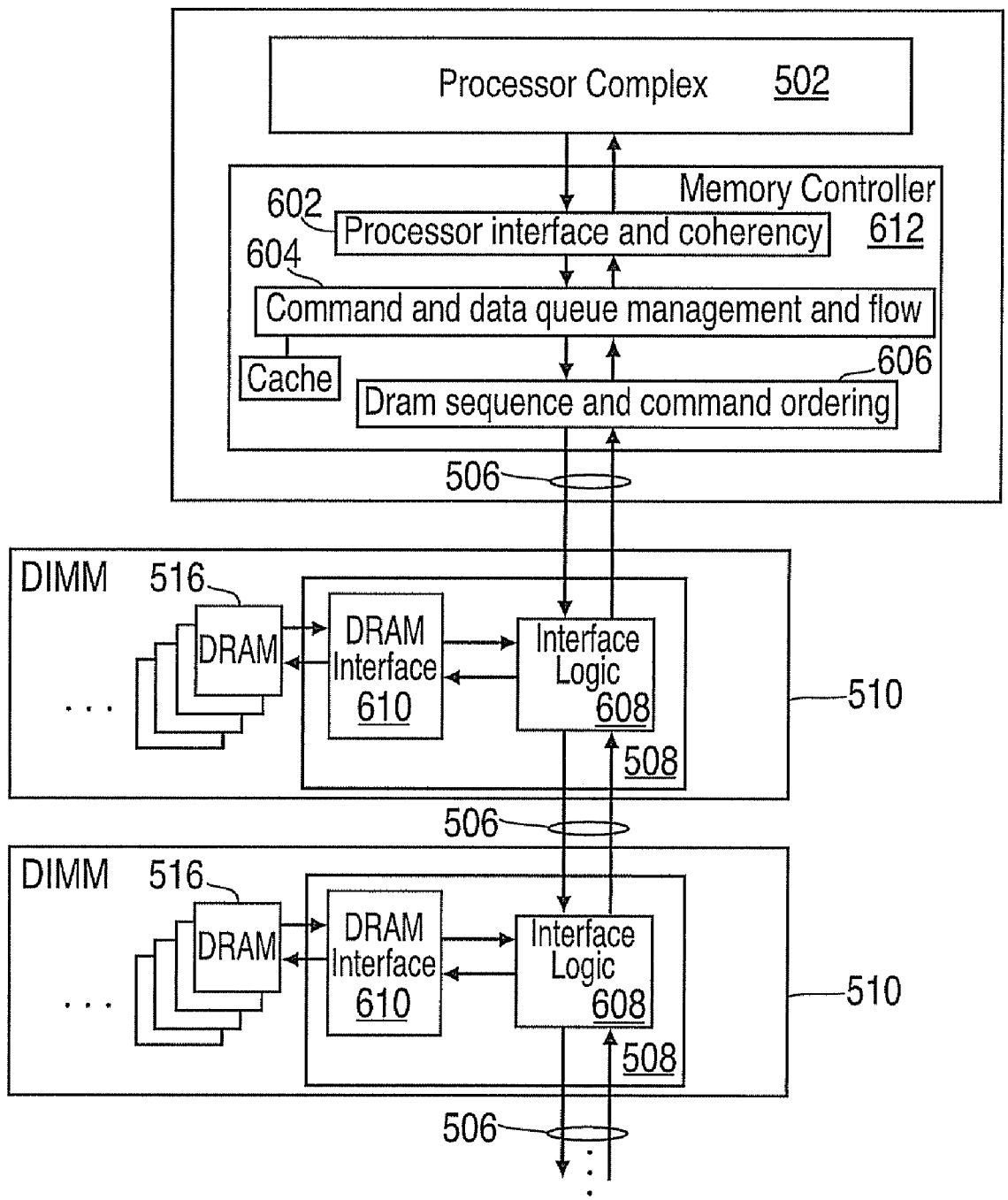
FIG. 6 is a block diagram of an exemplary memory controller, memory module and memory interconnect structure.

FIG. 6 is a block diagram of an exemplary technology specific memory controller and memory module structure that depicts the current art associated with the identification and placement of memory controller and memory module/hub functions in a cascade interconnect memory system structure. As depicted in FIG. 6, a processor or processor complex 502 is in communication with a technology specific memory controller 612. Alternatively, the technology specific memory controller 612 may be depicted as being inside of a processor or inside of the processor complex 502. The processor complex 502 includes one or more processor devices, cache devices, cache controls and other processor related elements. The technology specific memory controller 612 depicted in FIG. 6 performs a variety of functions including: processor interface and coherency functions 602; command and data queue management and flow functions 604; and DRAM sequence and command ordering functions 606. The processor interface and coherency functions 602 provide communication between the technology specific memory controller 612 and the processor complex 502 across a processor interface so that each can track the status of the other. The command and data queue management and flow functions 604 schedule and issue memory operations based on existing (in-process) and queued requests. The DRAM sequence and command ordering functions 606 create the technology specific address, command, data and other related information transfers required by the memory modules 510, and manage the flow of data into and out of the memory modules 510. The memory device timing and command information is specific to the memory module 510, memory device technology 516 and memory hub 508 requirements/characteristics being accessed, thereby ensuring that the memory hub and memory device functional and timing specifications are not violated.

Also depicted in FIG. 6 are memory modules 510 that include hub logic chips 508 and memory devices 516. The hub logic chip 508 contains interface logic 608 and a DRAM interface 610. The interface logic 608 provides a bus level interface for receiving the information being passed via the memory bus 506. The interface logic 608 utilizes the information locally and/or sends the information (downstream or upstream) via the memory bus 506 to the next memory module 510. The DRAM interface 610 provides the communication interface between the hub and the memory devices, and is therefore very specific to the configuration of the memory device(s) 516 on the memory module 510. For example, based on the number and type of memory devices 516, the voltage of the memory devices 516, the timings, and the exact locations of the memory devices 516, the DRAM interface 610 will develop the technology-specific command, address, data and other information, using the appropriate device timings and interface characteristics—generally as defined during initial power-up of the memory system. This configuration-specific information is utilized by the DRAM interface 610 to coordinate the transmitting and receiving of data between the hub logic chip 508 and the memory devices 516.

Figure 7:
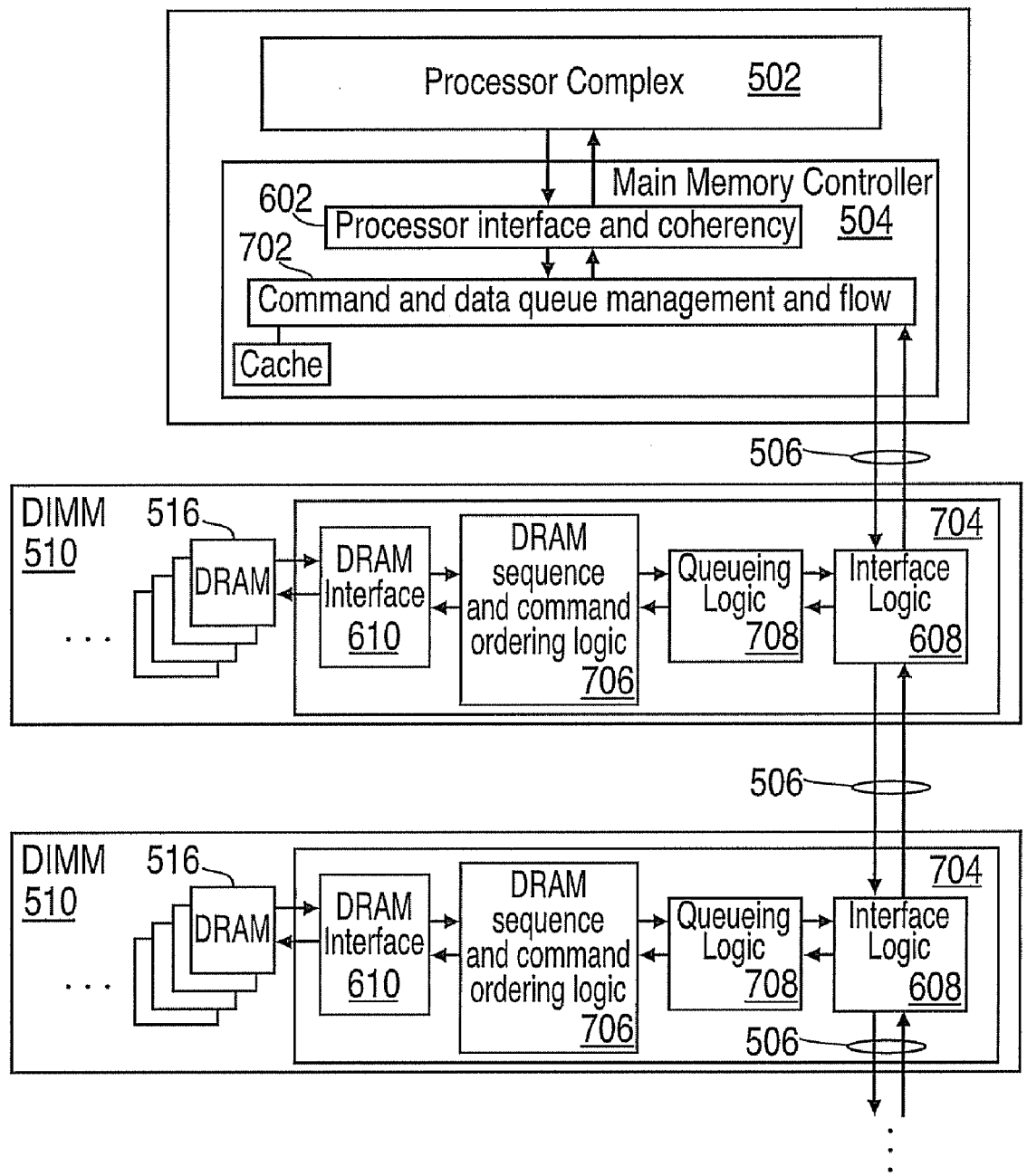
FIG. 7 is a block diagram of an exemplary memory controller, memory module and memory interconnect structure that may be implemented by exemplary embodiments.

FIG. 7 is a block diagram of an exemplary memory controller and memory module structure that may be implemented by exemplary embodiments. FIG. 7 depicts the major functions that have been removed from the technology specific memory controller 612 in FIG. 6 and distributed to each of the one or more memory modules 510 installed on the cascade interconnect memory bus 506. The resulting technology independent, or generic, memory controller is referred to as the main memory controller 504. The processor complex 502 continues to include one or more processor devices, cache devices, cache controls and other processor related elements. As evidenced in FIG. 7, the main memory controller 504 continues to interface to the local cache, and generates high-level read or write request(s) onto the memory bus 506 based on either the local cache contents or the caching algorithm implemented in the processor and/or the main memory controller 504. The high-level read or write request, in conjunction with the address information provided by the main memory controller 504, is received by the first memory module 510, which may simply forward the information to the subsequent memory module(s) 510 via bypass circuitry; receive, interpret and re-drive the information if it is determined to be targeting a downstream memory module 510; re-drive some or all of the information without first interpreting the information to determine the intended recipient; or perform a subset or combination of these options.

In FIG. 7, block 702 is similar to 604 in FIG. 6, however, the queuing and flow controls in 702 are related to the memory device technology-independent prioritization and scheduling/transmission of downstream commands, address, data and related information. In exemplary embodiments, the main memory controller 504 will generally send commands once adequate bandwidth is available on the downstream bus 506 (this may also be influenced by processor command prioritization). The queuing logic 708 on the memory subsystem or hub logic device 704 will then sort and process the commands based on the local memory device capabilities, current and pending requests, and command prioritization.

Upon receipt of a downstream information packet, generally consisting of command, address, data and/or other operational, initialization or status information (see FIG. 8 below for an exemplary packet structure), the interface logic 608 in the hub logic chip 704 will decode the information to determine if action is to be taken on that memory module 510. Generally, this determination is based on either an assessment of the command and/or address range associated with the operation. If the information is intended for that memory module 510, the information is added to a queue via the queuing logic 708, affected in some cases by the possible inclusion of prioritization information in the received downstream (information) packet.

Based on the current memory activity, the queuing logic 708 will pass a queued packet to the DRAM sequence and command ordering logic 706, which will determine the intended memory operation based on the high-level command information provided in the packet, and develop an appropriate command, address, data and timing sequence, in addition to the appropriate memory interface signaling, based on the memory technology utilized on the memory module 510. In a minimum write operation case, a series of technology-specific command, address, data and related information will be directed to the memory device(s) 516 using the appropriate timing and interface levels. In a more complex operation, the local memory control function, as implemented in the DRAM sequence and command ordering logic 706, will pre-condition (e.g., refresh, wake-up, pre-charge or open associated banks, and reconfigure the device operating modes via control register modifications or other means) the memory devices 516 in preparation for completing the operation(s) requested by the main memory controller 504. The DRAM sequence and command ordering logic 706 will then compile the appropriate sequence of memory commands, associated with the requested operation and targeted technology, and pass information such as the command, address and data information to the DRAM interface 610.

In exemplary embodiments, the DRAM interface 610 includes instructions for initiating all operations to the memory device(s) 516, using the appropriate drivers and receivers in conjunction with the specific command decodes, addresses and timings—as is widely practiced in the art. In cases where the hub logic chip 704 is capable of interfacing with more than one memory technology, the DRAM interface 610 will generally be programmable in nature to permit operation with one or more interface and/or signaling type, one or more command decodes, one or more clocking structures and/or one or more timing sequences. When designed to interface to more that one memory technology, the hub logic chip 704 will often include programmable register(s) which will be pre-conditioned, generally during initialization, to select the appropriate operating characteristics for the given memory technology.

To enable identification of information (data, status, error, etc) received by the main memory controller 504, the sourcing memory module 510/hub logic chip 704 will include a 'tag' as part of the information sent to the main memory controller 504. In exemplary embodiments, the information is in the form of information 'packets'. The tag will include data correlating the response packet(s) to a specific request from the main memory controller 504, and generally include information indicating identification of the memory module 510 sourcing the information packet(s)—as further means for the memory controller to confirm the validity of the response. Since the main memory controller 504 may receive this information at an unexpected time, the main memory controller 504 may temporarily store the information locally (using the command and data queue management flow logic 702), awaiting further information from the one or more memory modules 510, awaiting an appropriate time to transfer the information to the processor (or processor complex 502), or even discard the information if deemed to be no longer necessary (such as associated with a parallel access to both the main memory and local cache which results in a cache 'hit'). In the preferred embodiment, the tag information will be comprised of several bits of data within the packet, often included in the initial portion of the one or more transfers associated with the packet to facilitate rapid identification/prioritization of the response by the main memory controller 504.

A further aspect of the memory structure shown in FIG. 7 is the capability to produce systems having more than one memory technology on the one or more memory buses 506. Since the main memory controller 504 is providing high level commands to the memory subsystems, or memory modules 510, each of the one or more memory modules 510 may be comprised of different memory technologies, that may further operate at different voltages and/or timings—with the local memory subsystem buffer, or hub logic chip 704, converting the main memory controller 504 request(s) into a command, address, data, voltage and timing structure that is consistent with the memory technology utilized on that memory module 510. With the use of tags in conjunction with information transfers to the main memory controller 504, the variation in response times from different memory modules 510 can be readily accommodated by the main memory controller 504.

In further embodiments, the targeted memory module(s) 510 may also respond to 'write' operations and other commands to the memory module 510 that might not include a response as part of the conventional operating and/or interface specification. Although a response to each command would have some impact to the overall upstream information bandwidth, implementing a response for some or all of the downstream commands would reduce the probability of undetected memory system failures, as the main memory controller 504 would receive positive confirmation that the requested operations were completed successfully. Additional exemplary embodiments only result in the reporting of errors associated with operations that were intended for one or more memory modules 510, but were not completed by the one or more modules 510 due to such conditions as an unexpected outcome or illegal operation being requested.

Although not shown in FIG. 7, memory modules 510 have consistently included a separate bus, such as a 'presence detect' bus, an 12C bus and/or an SMBus which is used for one or more purposes including the determination of the memory module attributes (generally after power-up), the reporting of fault or status information to the system, the configuration of the memory subsystem(s) 510 after power-up or during normal operation, and/or for other purposes. Depending on the bus characteristics, this bus might also provide a means by which the valid completion of operations could be reported by the memory module(s) 510 to the main memory controller(s) 504, or the identification of failures occurring during the execution of the main memory controller requests.

FIG. 8 depicts an exemplary upstream data packet, which could be sent by one or more of the memory modules 510, via the cascade interconnect memory bus 506, to the main memory controller 504. This exemplary data packet consists of nineteen bit lanes and one header and eight data transfers, yielding a total of one hundred and seventy one bit positions. Other exemplary packets may have more or less bit lanes and more or less transfers, and may include one or more spare bit lanes, based on the application requirements and/or conditions. The packet header is shown under the channel lane numbers, and defines the location of the tag (bits 0-5), command (CMD) bits (6-7), status (STS) bits (8-9), ECC bits (12-17), and other lanes which may be used for functions such as interrupts, spare bit lanes, CRC, data and other information that might apply to a given application. In exemplary embodiments, the tag bits are utilized by the main memory controller 504 to match packets received at the main memory controller 504 to corresponding memory operations. The subsequent transfers (identified as transfers 0-7) refer to the data transfers that follow the header, and in the exemplary embodiment include 18 bit lanes, identified as 0 through 17, and 8 transfers, identified as 0 through 7, comprising a total of 144 bit positions (e.g. 16 bytes of data plus the associated EDC check bits). An additional bit lane is shown (shown as column 18 of FIG. 8), which may be used for such purposes as a spare bit lane.

The locations, count and function of each of the defined bit positions may also vary from what is described. In one case, an upstream data transfer packet might consist exclusively of header and status information, comprising one or several transfers. This packet may be used to report completion of an operation such as a write command or refresh, report an error condition, report a status condition (such as module or device temperature) or provide other information that requires a limited number of bit positions/transfers. In another case, the full nine transfers may be included in the packet, which may provide data to the main memory controller 504 associated with a read request initiated by the main memory controller 504, data from a self-initiated read operation (initiated by the memory subsystem, or memory module 510), in conjunction with information such as ECC bits and/or CRC bits, status bits, tag bits and other information.

In many cases, one or more packet transfers will be required to provide the requested/required information to the main memory controller 504 and/or processor(s) in the processor complex 502, with four or eight packets commonly used. The one or more packets may also include information associated with more than one requested operation. For example, a series of packets associated with a requested read to a second memory module 510 might be sent to the main memory controller 504 by way of the upstream bus and a first memory module 510 located upstream from the second memory module 510 and prior to the main memory controller 504. Upon receipt of the first of the one or more packets, the first memory module 510 might concatenate separate and independent tag and/or status information to the one or more packets traveling upstream, generally in locations pre-defined for this purpose, such that the resulting packets include information associated with two or more independent operations from one or more separate memory modules 510. In this manner, the utilization of the available bus bandwidth can be maximized by ensuring that all of the possible bit positions in the packets are utilized. Examples of two independent operations might include the results of a read operation from a second memory module 510, to which status information is appended from a first memory module 510, such as a write operation completion status, a refresh completion status, a mode change status, environmental information such as temperature, or other information.

Although not shown in FIG. 8, exemplary downstream packets are structured in a similar manner, with multiple bit lanes and one or more transfers involved in the communication of command, address, data, status, initialization, priority flag(s) and other information from the main memory controller 504 to the one or more memory modules 510 on the memory bus(es) 506. The downstream packet will often be included as a portion of a multi-packet transfer, with the bit lanes in each packet having the same or different functions based on the specific transfer and/or the packet number (such as the first packet of four packets or the eighth packet of eight total packets). This is also true for the upstream packet.

Exemplary embodiments include a computer memory system for storing and retrieving data in a processing system. The system includes a memory bus 506, a main memory controller 504, one or more memory devices 516, and one or more hub logic devices 508. The memory devices 516 are characterized by technology specific memory device protocols and signaling requirements. The main memory controller 504 is in communication with the memory bus 506 for generating, receiving and responding to memory access requests. The hub devices (also referred to herein as hub logic devices 508) are in communication with the memory bus 506 and with the memory devices 516 for controlling the memory devices 516 responsively to the memory access requests received from the main memory controller 504 and for responding to the main memory controller 504 with state or memory data. The main memory controller 504 and the hub devices communicate via the memory bus 506 using messages that are in a message format and protocol for indicating memory read, memory write, memory system power management and control that is independent of the memory device protocols and signaling requirements. As further clarification, the message format and protocol utilized for communication between the main memory controller 504 and the hub devices is memory technology independent. One advantage to having a technology independent main memory controller 504 is that the memory devices 516 in a memory subsystem being accessed by the main memory controller 504 may be of more than one type of technology (e.g., DDR SDRAMs and DDR2 SDRAMs).

In exemplary embodiments one or more of the hub devices are not in communication with any of the memory devices 516. This hub device may be utilized as a signal repeater for translating between any combination of optical and electrical signals. Further, this hub device may be utilized as a hub for concentrating communication traffic.

Exemplary embodiments of the main memory controller 504 include a programmable configuration to allow the bus 506 to be configured as a plurality of independent busses 506, as plurality of busses 506 operating in unison in support of a common message stream, or as a single bus 506 to the hub devices. In addition, the main memory controller 504 may have a programmable configuration for specifying maximum outstanding messages and data buffering that may be active within the hub device. Depending on the hub device design, and directly related to the address, command, data and related storage capacity on the hub, the hub may be able to operate with as few as two outstanding and/or pending memory operations, or support larger numbers of pending operations such as 8, 16 or more. Exemplary embodiments of the main memory controller 504 also include the ability of the main memory controller 504 to flush and hold the bus 506 and the hub devices free of messages except control messages for roll-back and recovery, responsive to a detected error condition. In this manner, or in any alternate manner, the main memory controller 504 can synchronize the hub devices for having the memory devices 516 in communication with the hub devices in a consistent state. The memory devices 516 in communication with two or more of the hub devices may be forced to a synchronization point in response to receiving a control message from the main memory controller 504 requiring the memory devices 516 in communication with the hub devices to operate in logical synchrony across the two or more hub devices.

In exemplary embodiments, the hub devices include message queues for receiving one or more messages before servicing the message(s). These message queues are managed by the queuing logic 708 located on the hub devices. In addition, the queuing logic 708 may be utilized to implement a programmable priority arbiter for servicing messages in the queues in an order optimal for a memory device service rate, a power utility and/or a bus communication efficiency. Further, the message queues, via the queuing logic 708, may include a programmable priority arbiter for servicing messages in the queues according to a priority encoded by the main memory controller 504 and included in the messages.

In exemplary embodiments, the interface logic 608 in the hub devices may receive a flush control message from the main memory controller 504 which causes the hub device to invalidate a valid message, and causes the hub device to be blocked from receiving new messages except for hub device control messages. The hub device then resumes receiving and servicing messages after the interface logic 608 on the hub device detects a specific control message indicating a return to normal operation. In addition, the hub device may send a control reply message (e.g., in response to a request from the main memory controller 504) indicating an operation state and/or conditions on the hub logic device. This control reply message may be sent via the bus 506 or via an alternate bus 506, or channel, and may indicate, for example, that a write command has been successfully completed. Alternatively, a specific alert state may be encoded into a reply or idle cycle to the hub device, for having the main memory controller 504 responsively poll the hub devices for operation state and conditions.

Memory devices, hubs, buffers, registers, clock devices, passives and other memory support devices and/or components may be attached to the memory subsystem, or memory module 510, via various methods including solder interconnects, conductive adhesives, socket structures, pressure contacts and other methods which enable communication between the two or more devices via electrical, optical or alternate means.

The one or more memory subsystem(s), or memory modules 510, may be connected to the memory system, processor complex, computer system or other system environment via one or more methods such as soldered interconnects, connectors, pressure contacts, conductive adhesives, optical interconnects and other communication and power delivery methods. Connector systems may include mating connectors (male/female), conductive contacts and/or pins on one carrier mating with a male or female connector, optical connections, pressure contacts (often in conjunction with a retaining mechanism) and/or one or more of various other communication and power delivery methods. The interconnection(s) may be disposed along one or more edges of the memory assembly and/or placed a distance from an edge of the memory subsystem depending on such application requirements as ease-of-upgrade/repair, available space/volume, heat transfer, component size and shape and other related physical, electrical, optical, visual/physical access, etc.

Additional functions that may reside local to the memory subsystem, or memory module 510, include write and/or read buffers, one or more levels of memory cache, local pre-fetch logic, data encryption/decryption, compression/decompression, protocol translation, command prioritization logic, voltage and/or level translation, error detection and/or correction circuitry, data scrubbing, local power management circuitry and/or reporting, operational and/or status registers, initialization circuitry, performance monitoring and/or control, one or more co-processors, search engine(s) and other functions that may have previously resided in other memory subsystems. By placing a function local to the memory subsystem, added performance may be obtained as related to the specific function, often while making use of unused circuits within the subsystem.

Memory subsystem support device(s) may be directly attached to the same substrate or assembly onto which the memory device(s) 516 are attached, or may be mounted to a separate interposer or substrate also produced using one or more of various plastic, silicon, ceramic or other materials which include electrical, optical or other communication paths to functionally interconnect the support device(s) to the memory device(s) 516 and/or to other elements of the memory or computer system.

Information transfers along a bus, channel, link or other naming convention applied to an interconnection method may be completed using one or more of many signaling options. These signaling options may include such methods as single-ended, differential, optical or other approaches, with electrical signaling further including such methods as voltage or current signaling using either single or multi-level approaches. Signals may also be modulated using such methods as time or frequency, non-return to zero, phase shift keying, amplitude modulation and others. Voltage levels are expected to continue to decrease, with 1.5V, 1.2V, 1V and lower signal voltages expected consistent with (but often independent of) the reduced power supply voltages required for the operation of the associated integrated circuits themselves.

One or more clocking methods may be utilized within the memory subsystem and the memory system itself, including global clocking, source-synchronous clocking, encoded clocking or combinations of these and other methods. The clock signaling may be identical to that of the signal lines themselves, or may utilize one of the listed or alternate methods that is more conducive to the planned clock frequency (ies), and the number of clocks planned within the various subsystems. A single clock may be associated with all communication to and from the memory, as well as all clocked functions within the memory subsystem, or multiple clocks may be sourced using one or more methods such as those described earlier. When multiple clocks are used, the functions within the memory subsystem may be associated with a clock that is uniquely sourced to the subsystem, or may be based on a clock that is derived from the clock related to the information being transferred to and from the memory subsystem (such as that associated with an encoded clock). Alternately, a unique clock may be used for the information transferred to the memory subsystem, and a separate clock for information sourced from one (or more) of the memory subsystems. The clocks themselves may operate at the same or a frequency multiple of the communication or functional frequency, and may be edge-aligned, center-aligned or placed in an alternate timing position relative to the data, command or address information.

Information passing to the memory subsystem(s) will generally be composed of address, command and data, as well as other signals generally associated with requesting or reporting status or error conditions, resetting the memory, completing memory or logic initialization and other functional, configuration or related information. Information passing from the memory subsystem(s) may include any or all of the information passing to the memory subsystem(s), however generally will not include address and command information. This information may be communicated using communication methods that may be consistent with normal memory device interface specifications (generally parallel in nature), the information may be encoded into a 'packet' structure, which may be consistent with future memory interfaces or simply developed to increase communication bandwidth and/or enable the subsystem to operate independently of the memory technology by converting the received information into the format required by the receiving device(s).

Initialization of the memory subsystem may be completed via one or more methods, based on the available interface busses, the desired initialization speed, available space, cost/complexity objectives, subsystem interconnect structures, the use of alternate processors (such as a service processor) which may be used for this and other purposes, etc. In one embodiment, the high speed bus may be used to complete the initialization of the memory subsystem(s), generally by first completing a training process to establish reliable communication, then by interrogation of the attribute or 'presence detect' data associated the various components and/or characteristics associated with that subsystem, and ultimately by programming the appropriate devices with information associated with the intended operation within that system. In a cascaded system, communication with the first memory subsystem would generally be established, followed by subsequent (downstream) subsystems in the sequence consistent with their position along the cascade interconnect bus.

A second initialization method would include one in which the high speed bus is operated at one frequency during the initialization process, then at a second (and generally higher) frequency during the normal operation. In this embodiment, it may be possible to initiate communication with all of the memory subsystems on the cascade interconnect bus prior to completing the interrogation and/or programming of each subsystem, due to the increased timing margins associated with the lower frequency operation.

A third initialization method might include operation of the cascade interconnect bus at the normal operational frequency(ies), while increasing the number of cycles associated with each address, command and/or data transfer. In one embodiment, a packet containing all or a portion of the address, command and/or data information might be transferred in one clock cycle during normal operation, but the same amount and/or type of information might be transferred over two, three or more cycles during initialization. This initialization process would therefore be using a form of 'slow' commands, rather than 'normal' commands, and this mode might be automatically entered at some point after power-up and/or re-start by each of the subsystems and the memory controller by way of POR (power-on-reset) logic included in each of these subsystems.

A fourth initialization method might utilize a distinct bus, such as a presence detect bus (such as the one defined in U.S. Pat. No. 5,513,135) an I2C bus (such as defined in published JEDEC standards such as the 168 Pin DIMM family in publication 21-C revision 7R8) and/or the SMBus, which has been widely utilized and documented in computer systems using such memory modules. This bus might be connected to one or more modules within a memory system in a daisy chain/cascade interconnect, multi-drop or alternate structure, providing an independent means of interrogating memory subsystems, programming each of the one or more memory subsystems to operate within the overall system environment, and adjusting the operational characteristics at other times during the normal system operation based on performance, thermal, configuration or other changes desired or detected in the system environment.

Other methods for initialization can also be used, in conjunction with or independent of those listed. The use of a separate bus, such as described in the fourth embodiment above, also offers the advantage of providing an independent means for both initialization and uses other than initialization, such as described in U.S. Pat. No. 6,381,685 to Dell et al., of common assignment herewith, including changes to the subsystem operational characteristics on-the-fly and for the reporting of and response to operational subsystem information such as utilization, temperature data, failure information or other purposes.

With improvements in lithography, better process controls, the use of materials with lower resistance, increased field sizes and other semiconductor processing improvements, increased device circuit density (often in conjunction with increased die sizes) will help facilitate increased function on integrated devices as well as the integration of functions previously implemented on separate devices. This integration will serve to improve overall performance of the intended function, as well as promote increased storage density, reduced power, reduced space requirements, lower cost and other manufacturer and customer benefits. This integration is a natural evolutionary process, and may result in the need for structural changes to the fundamental building blocks associated with systems.

The integrity of the communication path, the data storage contents and all functional operations associated with each element of a memory system or subsystem can be assured, to a high degree, with the use of one or more fault detection and/or correction methods. Any or all of the various elements may include error detection and/or correction methods such as CRC (Cyclic Redundancy Code), EDC (Error Detection and Correction), parity or other encoding/decoding methods suited for this purpose. Further reliability enhancements may include operation re-try (to overcome intermittent faults such as those associated with the transfer of information), the use of one or more alternate or replacement communication paths to replace failing paths and/or lines, complement-re-complement techniques or alternate methods used in computer, communication and related systems.

The use of bus termination, on busses as simple as point-to-point links or as complex as multi-drop structures, is becoming more common consistent with increased performance demands. A wide variety of termination methods can be identified and/or considered, and include the use of such devices as resistors, capacitors, inductors or any combination thereof, with these devices connected between the signal line and a power supply voltage or ground, a termination voltage or another signal. The termination device(s) may be part of a passive or active termination structure, and may reside in one or more positions along one or more of the signal lines, and/or as part of the transmitter and/or receiving device(s). The terminator may be selected to match the impedance of the transmission line, or selected via an alternate approach to maximize the useable frequency, operating margins and related attributes within the cost, space, power and other constraints.

Technical effects and benefits of exemplary embodiments include the ability to distribute memory controller functions between a processor and a memory subsystem(s) in a manner such that the processor retains a close linkage to the internal coherency buses and cache structures, while eliminating the linkage to a specific memory technology. This allows processor(s) to be designed with generic memory control functions and allows the system designer(s) to decide what memory technology is optimal for a given application and/or market segment, at a given point in time. Systems can therefore be designed to utilize any memory technology that may be available, allowing the development of different system configurations to fit different market requirements, with reduced design cycle times and at lower cost and risk.

Exemplary embodiments may also be utilized to mix memory technologies within a memory system and to provide the ability to upgrade the memory devices and/or memory modules within a memory system without having to upgrade the memory controller and/or processor. Exemplary embodiments support the use of more than one memory technology within the memory system. Because the main memory controller provides high level commands to the memory subsystems, each of the memory subsystems may be comprised of different memory technologies that may further operate at different voltages and/or timings. The use of tags in conjunction with information transfers allows the main memory controller to accommodate the variation in response times and to correlate responses to specific requests and/or memory subsystems.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A computer memory system for storing and retrieving data, the system comprising:
   a memory bus;
   a main memory controller in communication with the memory bus for generating, receiving, and responding to memory access requests;
   one or more memory devices characterized by memory device protocols and signaling requirements for command, address, data, voltage and timing operational specifications; and
   one or more hub devices in communication with the memory bus and with the memory devices for controlling the memory devices responsively to the memory access requests received from the main memory controller and for responding to the main memory controller with state or memory data,
   wherein the main memory controller and the hub devices communicate via the memory bus in messages in a message format and protocol for indicating memory read, memory write, memory system power management and control that is independent of the memory device protocols and signaling requirements, and the hub devices further comprise device timing and command ordering logic to pre-condition the one or more memory devices in preparation for completing the memory access requests and compile a sequence of memory commands associated with the memory access requests.

2. The system of claim 1 wherein the memory bus is comprised of one or more of electrical signaling and optical signaling.

3. The system of claim 1 wherein at least one of the hub devices is not in communication with any of the memory devices.

4. The system of claim 3 wherein the hub device that is not in communication with any of the memory devices is utilized as a signal repeater for translating between any combination of optical and electrical signals.

5. The system of claim 3 wherein the hub device that is not in communication with any of the memory devices is utilized as a hub for concentrating communication traffic via concatenating separate and independent tags to one or more packets traveling upstream from the hub device that is not in communication with any of the memory devices to the main memory controller, such that resulting packets include information associated with two or more independent operations from one or more separate memory modules.

6. The system of claim 1 wherein one or more of the hub devices add one or more tag bits to the messages for use by the main memory controller in correlating a message from a hub device to one or more of an outstanding memory access request and the hub device.

7. The system of claim 1 wherein the hub devices are in communication with the memory channel in a cascade interconnect or point-to-point manner.

8. The system of claim 1 wherein the main memory controller has a programmable configuration to allow the bus to be configured as a plurality of independent busses, a plurality of busses operating in unison in support of a common message stream, or as a single bus to the hub devices.

9. The system of claim 1 wherein the main memory controller has a programmable configuration for specifying a maximum outstanding messages and data buffering that may be active within the hub device.

10. The system of claim 1 wherein the main memory controller flushes and holds the bus and the hub devices free of messages except control messages for roll-back and recovery, responsive to a detected error condition.

11. The system of claim 1 wherein the main memory controller synchronizes the hub devices for having the memory devices in communication with the hub devices in a consistent state.

12. The system of claim 1 wherein the bus includes an out of order message service and replies with identification tag bits assigned by the main memory controller to received requests and to any associated transmitted bus messages, and the identification tag bit expected on associated received replies from the hub devices.

13. The system of claim 1 wherein one or more of the hub devices include message queues for receiving a plurality of messages before the messages have been serviced.

14. The system of claim 13 wherein the hub devices with the message queues include a programmable priority arbiter for servicing messages in the queues in one or more of an order optimal for a memory device service rate, a power utility and a bus communication efficiency.

15. The system of claim 13 wherein the hub devices with the message queues include a programmable priority arbiter for servicing messages in the queues according to a priority encoded by the main memory controller and included in the messages.

16. The system of claim 1 wherein one or more of the hub devices invalidates a valid message and the hub device is blocked from receiving new messages except for hub device control messages, the blocking in response to a flush control message received from the main memory controller via the bus.

17. The system of claim 16 wherein the hub devices that invalidate a valid message receive and service messages after detecting a specific control message indicating to do so.

18. The system of claim 1 wherein the memory devices in communication with one of the hub devices may be forced to a synchronization point, responsive to a control message received at the hub device from the main memory controller via the bus for having the memory devices in communication with the hub device operate in logical synchrony across a plurality of the hub devices.

19. The system of claim 1 wherein a control reply message may be sent to one of the hub devices, responsive to a specific request to do so, for indicating operation state and conditions to the main memory controller.

20. The system of claim 1, wherein a specific alert state may be encoded into a reply or idle cycle to the hub device, for having the main memory controller responsively poll the hub devices for operation state and conditions.

21. A memory system, the system comprising:
   at least one main memory controller;
   a memory bus in communication with the main memory controller; and
   a memory subsystem including a hub device and in communication with the memory bus for connecting the main memory controller to the memory subsystem, wherein the at least one main memory controller provides operational information to the hub device in a technology-independent format and the hub device comprises device timing and command ordering logic to converts the information into a technology-dependent format that is consistent with command, address, data, voltage and timing operational specifications associated with one or more memory devices attached to the memory subsystem, wherein the device timing and command ordering logic pre-conditions the one or more memory devices in preparation for completing a requested memory operation and compiles a sequence of memory commands associated with the requested memory operation, and information returned to the memory controller includes one or more tag bits to correlate the information to one or more of the requested memory operation, the memory subsystem and the hub device.

22. The system of claim 21 wherein the memory bus includes one or more of a multi-drop bus and a cascade interconnect bus.

23. The system of claim 21 further comprising a second memory bus in communication with the at least one main memory controller and in communication with one or more of the memory subsystem and a second memory subsystem.

24. The system of claim 21 wherein the hub device transmits an indicator to the main memory controller when a command received from the main memory controller has been successfully executed by the hub device.

25. The system of claim 21 wherein a second bus independent of the memory bus is utilized to perform memory system functions.

26. The system of claim 25 wherein the memory system functions performed via the second bus include one or more of initialization and status reporting.

27. A method of storing and retrieving data in a processing system, the method comprising:
   receiving a technology-independent memory access request from a main memory controller in the processing system, the memory access request received at a hub device in a memory subsystem in the processing system via a memory bus in the processing system;
   converting the memory access request into a technology-dependent format that is consistent with command, address, data, voltage and timing operational specifications associated with one or more integrated circuit memory devices in the processing system attached to the memory subsystem, wherein the converting the memory access request into the technology-dependent format includes device timing and command ordering logic to pre-condition the one or more integrated circuit memory devices in preparation for completing the memory access request and compile a sequence of memory commands associated with the memory access request;
   executing the memory access request at the memory subsystem; and
   if the memory access request requires a response, then generating the response including tag bits for use by the main memory controller in correlating the response to one or more of the memory access request, the memory subsystem, and the hub device.

28. The method of claim 27 wherein the converting the memory access request into a technology-dependent format includes queuing logic to return read data in conjunction with the tag bits at a time unpredicted by a processor in the processing system, and preempting an earlier issued read request without losing the read data returned.

29. A memory subsystem, the memory subsystem comprising:
   a hub logic device comprising device timing and command ordering logic; and
   one or more memory devices in communication with the hub logic device, wherein the hub logic device receives commands in a technology-independent format from one or more requestors and converts the commands into a technology-dependent format that is consistent with command, address, data, voltage and timing operational specifications associated with the memory devices, the device timing and command ordering logic pre-conditions the one or more memory devices in preparation for completing the commands and compiles a sequence of memory commands associated with the commands, and if a command requires a response then generating the response including one or more tag bits for correlating the response to one or more of the command and the hub logic device.

30. A memory system, the memory system comprising:

at least one main memory controller;

a memory subsystem including a hub logic device and one or more memory devices, the hub logic device comprising device timing and command ordering logic to pre-condition the one or more memory devices in preparation for completing requested memory operations and compile a sequence of memory commands associated with the requested memory operations; and a communication bus which connects the at least one main memory controller to the memory subsystem, wherein the at least one main memory controller provides commands including the requested memory operations to the hub logic device in a technology-independent format and the hub logic device converts the commands into a technology-dependent format that is consistent with operational specifications associated with the memory devices, and information returned to the main memory controller from the memory subsystem includes one or more tag bits to correlate the information to one or more of a requested memory operation and the memory subsystem, independent of an order of issuing the requested memory operations.

31. A hub logic device comprising:

a memory device interface for converting technology independent memory access requests into technology dependent memory access requests consistent with command, address, data, voltage and timing operational specifications associated with one or more memory devices in communication with the hub logic device;

device timing and command ordering logic for pre-conditioning the one or more memory devices in preparation for completing the memory access requests and compiling a sequence of memory commands associated with the memory access requests; and interface logic for receiving the technology independent memory access requests from one or more requestors and if a memory access request requires a response then generating the response including one or more tag bits for correlating the response to the memory access request.

* * * * *